United States Patent
Izumi et al.

(10) Patent No.: US 8,041,441 B2
(45) Date of Patent: Oct. 18, 2011

(54) PRODUCTION MANAGEMENT METHOD AND PRODUCTION MANAGEMENT SYSTEM

(75) Inventors: Hiroaki Izumi, Tokyo (JP); Katsuhiko Takahashi, Tokyo (JP); Katsumi Morikawa, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 418 days.

(21) Appl. No.: 12/010,446

(22) Filed: Jan. 25, 2008

(65) Prior Publication Data
US 2008/0275584 A1    Nov. 6, 2008

(30) Foreign Application Priority Data
Jan. 25, 2007 (JP) .................. 2007-014809

(51) Int. Cl.
*G06F 19/00* (2011.01)
*G06K 9/00* (2006.01)

(52) U.S. Cl. ........ 700/101; 382/141; 382/145; 382/147; 382/157; 700/97; 700/109; 700/182

(58) Field of Classification Search .................. 700/182, 700/97, 101, 109; 382/141, 145, 147, 157
See application file for complete search history.

(56) References Cited

U.S. PATENT DOCUMENTS

| | | | | |
|---|---|---|---|---|
| 5,444,632 A * | 8/1995 | Kline et al. | .................. | 700/100 |
| 5,612,886 A * | 3/1997 | Weng | .................. | 700/101 |
| 5,889,673 A * | 3/1999 | Pan et al. | .................. | 700/97 |
| 6,490,494 B1 * | 12/2002 | Yasuda | .................. | 700/101 |
| 6,868,298 B2 * | 3/2005 | Baweja et al. | .................. | 700/100 |
| 2003/0130756 A1 * | 7/2003 | Baweja et al. | .................. | 700/100 |

FOREIGN PATENT DOCUMENTS

JP    11-145021    5/1999

OTHER PUBLICATIONS

Hirotani et al., "Analysis and Design of Self-Balancing Production Line", 2006, Scientific Direct, p. 1-15.*
Katsuhiko et al., "Comparing Integration Strategies in Production Ordering Systems", 1996 Elsevier,p. 1-7.*
Hirotani et al., "Analysis and Design of Self-Balance Production Line", 2006, Hiroshima University, Science Direct. p. 488-502.*
Takahashi et al., "Production Planning and Inventory Control in a Company Manufacturing PC Parts: a Case Study", 2001, Production Planning & Contro, p. 296-308.*

* cited by examiner

*Primary Examiner* — Albert Decady
*Assistant Examiner* — Thomas Stevens
(74) *Attorney, Agent, or Firm* — Young & Thompson

(57) ABSTRACT

A production management system has processing devices A, B, C, D, E, and P. A kind of product α is processed in the order of the processing devices A, P, B, P, and C, and a kind of product β is processed in the order of the processing devices D, P, E, and P. To determine whether the processing device P is to be used to produce the product α or the product β, an input ratio of each kind of product is multiplied by the number of times of passing the processing device P for each kind of product, thereby calculating a core of each kind of product. Based on the calculated score, whether the processing device P is to be used to produce the product α or the product β is determined. Accordingly, the work-in-process balance of key processes between different kinds of products can be equalized.

14 Claims, 24 Drawing Sheets

| | KIND OF PRODUCT α | | | KIND OF PRODUCT β | |
|---|---|---|---|---|---|
| | PROCESS 12 | PROCESS 14 | PROCESS 16 | PROCESS 22 | PROCESS 24 |
| INITIAL WORK-IN-PROCESS | THREE LOTS | ZERO LOT | ZERO LOT | TWO LOTS | ZERO LOT |
| LAPSE OF ONE DAY | TWO LOTS | ONE LOT | ZERO LOT | TWO LOTS | ZERO LOT |
| LAPSE OF TWO DAYS | ONE LOT | TWO LOTS | ZERO LOT | TWO LOTS | ZERO LOT |
| LAPSE OF THREE DAYS | ONE LOT | TWO LOTS | ZERO LOT | ONE LOT | ONE LOT |
| LAPSE OF FOUR DAYS | ONE LOT | ONE LOT | ONE LOT | ONE LOT | ONE LOT |

|  | KIND OF PRODUCT α | | | KIND OF PRODUCT β | |
|---|---|---|---|---|---|
|  | PROCESS12 | PROCESS14 | PROCESS16 | PROCESS22 | PROCESS 24 |
| INITIAL WORK-IN-PROCESS | THREE LOTS | ZERO LOT | ZERO LOT | TWO LOTS | ZERO LOT |
| LAPSE OF ONE DAY | TWO LOTS | ONE LOT | ZERO LOT | TWO LOTS | ZERO LOT |
| LAPSE OF TWO DAYS | ONE LOT | TWO LOTS | ZERO LOT | TWO LOTS | ZERO LOT |
| LAPSE OF THREE DAYS | ONE LOT | TWO LOTS | ZERO LOT | ONE LOT | ONE LOT |
| LAPSE OF FOUR DAYS | ZERO LOT | THREE LOTS | ZERO LOT | ONE LOT | ONE LOT |

FIG.6

|  | KIND OF PRODUCT α | | | KIND OF PRODUCT β | |
|---|---|---|---|---|---|
|  | PROCESS12 | PROCESS14 | PROCESS16 | PROCESS22 | PROCESS 24 |
| INITIAL WORK-IN-PROCESS | THREE LOTS | ZERO LOT | ZERO LOT | TWO LOTS | ZERO LOT |
| LAPSE OF ONE DAY | TWO LOTS | ONE LOT | ZERO LOT | TWO LOTS | ZERO LOT |
| LAPSE OF TWO DAYS | TWO LOTS | ZERO LOT | ONE LOT | TWO LOTS | ZERO LOT |
| LAPSE OF THREE DAYS | TWO LOTS | ZERO LOT | ONE LOT | ONE LOT | ONE LOT |
| LAPSE OF FOUR DAYS | THREE LOTS | ZERO LOT | ZERO LOT | ONE LOT | ONE LOT |

FINISHED

FIG.7

|  | KIND OF PRODUCT α | | | KIND OF PRODUCT β | |
| --- | --- | --- | --- | --- | --- |
|  | PROCESS12 | PROCESS14 | PROCESS16 | PROCESS22 | PROCESS 24 |
| INITIAL WORK-IN-PROCESS | THREE LOTS | ZERO LOT | ZERO LOT | TWO LOTS | ZERO LOT |
| LAPSE OF ONE DAY | TWO LOTS | ONE LOT | ZERO LOT | TWO LOTS | ZERO LOT |
| LAPSE OF TWO DAYS | ONE LOT | TWO LOTS | ZERO LOT | TWO LOTS | ZERO LOT |
| LAPSE OF THREE DAYS | ONE LOT | TWO LOTS | ZERO LOT | ONE LOT | ONE LOT |
| LAPSE OF FOUR DAYS | ONE LOT | ONE LOT | ONE LOT | ONE LOT | ONE LOT |

FIG.8

|  | NORMAL MODE (PRESS SELECTION BUTTON 71) | ADJUSTMENT MODE (PRESS SELECTION BUTTON 72) |
|---|---|---|
| LEVEL WORK IN PROCESS (PRESS SELECTION BUTTON 61) | SELECT FIRST ALGORITHM | SELECT SECOND ALGORITHM |
| EQUALIZE (PRESS SELECTION BUTTON 62) | SELECT THIRD ALGORITHM | SELECT FOURTH ALGORITHM |
| EMBED PROCESS HAVING SMALL NUMBER OF WORK IN PROCESS (PRESS SELECTION BUTTON 63) | SELECT FIFTH ALGORITHM | SELECT SIXTH ALGORITHM |

FIG.12

| | G1 | | G2 | | G3 | |
|---|---|---|---|---|---|---|
| STORAGE RACK / STORAGE AREA | 10a | 10p$_1$ | 10b | 10p$_2$ | 10c | 10p$_3$ |
| NUMBER OF PRODUCTS IN PROGRESS | a=9 | p1=9 | b=7 | p2=2 | c=3 | p3=10 |
| | g1=18 | | g2=9 | | g3=13 | |

FIG.14

| | G1 | | G2 | | G3 | |
|---|---|---|---|---|---|---|
| PROCESSING DEVICE (PROCESS) | A PROCESS 11 | P PROCESS 12 | B PROCESS 13 | P PROCESS 14 | C PROCESS 15 | P PROCESS 16 |
| REQUIRED PROCESSING TIME | Ta=1.5 | Tp=1 | Tb=1 | Tp=1 | Tc=0.5 | Tp=1 |
| | TG1 =2.5 | | TG2 =2 | | TG3 =1.5 | |

FIG.15

KIND OF PRODUCT α

| PROCESS | 11 | 12 | 13 | 14 | 15 | 16 |
|---|---|---|---|---|---|---|
| PROCESSING DEVICE | A | P | B | P | C | P |

KIND OF PRODUCT β

| PROCESS | 21 | 22 | 23 | 24 |
|---|---|---|---|---|
| PROCESSING DEVICE | D | P | E | P |

|  | KIND OF PRODUCT α | | | KIND OF PRODUCT β | |
| --- | --- | --- | --- | --- | --- |
|  | PROCESS12 | PROCESS14 | PROCESS16 | PROCESS22 | PROCESS 24 |
| INITIAL WORK-IN-PROCESS | THREE LOTS | ZERO LOT | ZERO LOT | TWO LOTS | ZERO LOT |
| LAPSE OF ONE DAY | TWO LOTS | ONE LOT | ZERO LOT | TWO LOTS | ZERO LOT |
| LAPSE OF TWO DAYS | ONE LOT | TWO LOTS | ZERO LOT | TWO LOTS | ZERO LOT |
| LAPSE OF THREE DAYS | ZERO LOT | THREE LOTS | ZERO LOT | TWO LOTS | ZERO LOT |
| LAPSE OF FOUR DAYS | ZERO LOT | THREE LOTS | ZERO LOT | ONE LOT | ONE LOT |

FIG.23

PRIOR ART

|  | KIND OF PRODUCT α | | | KIND OF PRODUCT β | |
|---|---|---|---|---|---|
|  | PROCESS12 | PROCESS14 | PROCESS16 | PROCESS22 | PROCESS 24 |
| INITIAL WORK-IN-PROCESS | THREE LOTS | ZERO LOT | ZERO LOT | TWO LOTS | ZERO LOT |
| LAPSE OF ONE DAY | THREE LOTS | ZERO LOT | ZERO LOT | ONE LOT | ONE LOT -- FINISHED |
| LAPSE OF TWO DAYS | THREE LOTS | ZERO LOT | ZERO LOT | TWO LOTS | ZERO LOT |
| LAPSE OF THREE DAYS | THREE LOTS | ZERO LOT | ZERO LOT | ONE LOT | ONE LOT -- FINISHED |
| LAPSE OF FOUR DAYS | THREE LOTS | ZERO LOT | ZERO LOT | TWO LOTS | ZERO LOT |

FIG.24

PRIOR ART

PRODUCTION MANAGEMENT METHOD AND PRODUCTION MANAGEMENT SYSTEM

TECHNICAL FIELD

The present invention relates to a production management method and a production management system, and, more particularly to a production management method and a production management system for managing production lines sharing the same processing device to produce plural kinds of products.

BACKGROUND OF THE INVENTION

Conventionally, in performing a mass production of the same kind of product, it is general to perform a series of process on an assembly production line. This production line is called a "conveyor production line", and is widely employed for products such as automobiles. In the conveyor line system, it is very important to keep constant a processing time of each process included in the production line. When a certain process requires a longer time than that of other processes, this process becomes a bottleneck, and decreases the operating rate of processing devices used in other processes.

On the other hand, in the production line of semiconductor chips and the like, the same processing device is often shared in plural processes, unlike the conveyor line system. This production line is called a "job-shop production line". In the manufacturing of semiconductor chips, for example, cleaning of wafers, film formation of conductors and dielectric substances, photolithography, and etching are performed repeatedly at many times.

Among the above processes, the wafer cleaning process rarely becomes a bottleneck, when the same processing device (cleaning device) is shared in plural processes, because many wafers can be collectively processed. The film formation process and the etching process require different conditions of process gas depending on materials to be formed and materials to be etched. Therefore, it is difficult to share the same processing device (a film formation chamber, an etching chamber) in plural processes. Consequently, in many cases, an exclusive chamber is used for each process of the film formation process and the etching process, and these processes seldom become bottlenecks. However, the film formation process and the etching process may become bottleneck processes when troubles occur in the devices.

On the other hand, the photolithography process usually requires a sharing of a stepper in plural processes, because a processing device (the stepper) to be used in the photolithography process is considerably expensive. Further, unlike the cleaning process, the photolithography process does not allow a batch process of many wafers, and requires the wafers to be processed one by one. Therefore, in the production line of semiconductor chips, the photolithography process becomes a bottleneck in many cases.

The processing device (the stepper in the above example) which becomes a bottleneck is sometimes shared to produce plural kinds of products. In this case, it is very difficult to determine which one of products in progress is to be processed first with priority among the products in progress accumulated before the processing device.

FIGS. 22A to 22C are one example of a job-shop production line for producing two kinds of products α and β. FIG. 22A is a schematic diagram showing processing devices to be used, FIG. 22B is a table of the processing devices to be used to produce the product α, laid out in the order of the processes, and FIG. 22C is a table of the processing devices to be used to produce the product β, laid out in the order of the processes.

As shown in FIG. 22A, the production line includes six processing devices A, B, C, D, E, and P, and a process to be executed by the processing device P is a key process. In this production line, as shown in FIG. 22B, six processes including a process 11 to a process 16 are performed to produce the product α, and the processing device P is used in the process 12, the process 14, and the process 16. As shown in FIG. 22C, four processes including a process 21 to a process 24 are performed to produce the product β, and the processing device P is used in the process 22 and the process 24.

In the above production line, many products in progress tend to be accumulated immediately before the key process performed by the processing device P. Therefore, it becomes necessary to determine which one of the products in progress should be processed with priority by the processing device P. In this case, as a method of determining the priority order, a First In First Out (FIFO) method and a Last Buffer First Served (LBFS) method are known. The former method, called the FIFO method, is a method of processing the products in progress, starting from the oldest product reaching the processing device. The latter method, called the LBFS method, is a method of processing the products in progress, placing a highest priority to the downstream process.

FIG. 23 is a table showing a transition of the number of products in progress when the FIFO method is used to determine the priority order.

In the example shown in FIG. 23, it is assumed that three lots of the product α are present immediately before the process 12, and two lots of the product β are present immediately before the process 22. Three lots of the product α are older products than two lots of the product β. The operation time of the key process using the processing device P is one day, and the operation time of the process using other processing device is zero day. In this case, when the priority order is determined based on the FIFO method, the products in progress shift as shown in FIG. 23. After four days pass, three lots of the product α are present immediately before the process 14, and one lot of the product β is present immediately before the process 22 and immediately before the process 24, respectively. In FIG. 23, the lots encircled by a round mark are the lots in progress (the same also applies to the subsequent explanations).

In this case, a work-in-process variance (σ) from the initial state until a lapse of four days is 1.2, and the number of finished lots is zero. As explained above, the use of the FIFO method has an advantage in that old stocks are processed with priority. On the other hand, as shown in FIG. 23, the use of the FIFO method has a disadvantage in that the products in progress shift in this order, and the number of products in progress is not equalized.

FIG. 24 is a table showing a transition of the number of products in progress when the LBFS method is used to determine the priority order.

In the example shown in FIG. 24, it is also assumed that three lots of the product α are present immediately before the process 12, and two lots of the product β are present immediately before the process 22. The operation time of the key process using the processing device P is one day, and the operation time of the process using other processing device is zero day. A priority order of the key process is defined such that the process 16 has a highest priority, and the process 24, the process 14, the process 22, and the process 12 have priorities in this order. In this case, the products in progress shift as shown in FIG. 24. After four days pass, three lots of the product α are present immediately before the process 12, and two new lots of the product β are present immediately before the process 22.

The addition of two new lots is because, in the production line of semiconductor chips, what is called CONWIP (CONstant Work-In-Process) is performed in many cases, to start new production of a product by the number of finished products.

In this case, a work-in-process variance (σ) from the initial state until a lapse of four days is 1.44, and the number of finished lots is two. As explained above, the use of the LBFS method has an advantage in that finished lots are obtained at an early stage. On the other hand, the use of the FIFO method has a disadvantage in that only one kind of product (the product β in this example) is processed, and production of other kind of product (the product α in this example) is not progressed.

As a method of determining a priority order in the job-shop production line, a method described in Japanese Patent Application Laid-open No. H11-145021 is known. However, in the technique proposed in the patent document, a priority order is determined based only on the processing time of the process immediately after the key process which becomes a bottleneck. Therefore, a proper priority order cannot be determined when the processing device P to be used in the key process is used for plural kinds of products.

SUMMARY OF THE INVENTION

The present invention has been achieved to solve the above problems, and therefore an object of the present invention is to provide an improved production management method and an improved production management system of a job-shop production line.

Another object of the present invention is to provide a production management method and a production management system capable of achieving equalization of the number of products in progress, using a production line sharing the same processing device in producing plural kinds of products.

A still another object of the present invention is to provide a production management method and a production management system capable of producing each kind of product at a desired rate, using a production line sharing the same processing device in producing plural kinds of products.

The above and other objects of the present invention can be accomplished by a production management method of a production line including a plurality of key processes sharing the same processing device in a production of a plurality of kinds of products, the production management method comprising:

a first step for calculating a score of each kind of product by performing a calculation using an input ratio of each kind of product and number of times of passing the processing device for each kind of product; and a second step of determining a first priority order of the key processes between different kinds of products based on the calculated score.

The above and other objects of the present invention can also be accomplished by a production management system that manages a production line including a plurality of key processes sharing the same processing device in a production of a plurality of kinds of products, the production management system comprising:

a first determination part that determines a first priority order of the key processes between different kinds of products, wherein the first determination part calculates a score of each kind of product by performing a calculation using an input ratio of each kind of product and number of times of passing the processing device for each kind of product; and determines the first priority order of the key processes between different kinds of products based on the calculated score.

Further, in producing the same kind of product, at the time of using at plural times the processing device becoming a key process, it is preferable to further determine a second priority order of the key process within the same kind of product. In this case, the second priority order within the same kind of product can be determined based on the FIFO method or the LBFS method. Alternatively, a key process having a largest number of products in progress present immediately before can have a high priority.

As explained above, according to the present invention, a work-in-process priority order of the key process between kinds of products is determined, based on the score calculated for each kind of product. Therefore, work-in-process balance of the key process between the kinds of products can be equalized. Therefore, excessive production of only a specific kind of product can be prevented.

Further, in producing the same kind of product, at the time of using at plural times the processing device becoming a key process, the work-in-process balance of the key process within the same kind of product can be also equalized, when the key process having a largest number of products in progress present immediately before has a high priority.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 6 is a table showing a transition of the number of products in progress when the selection button 51 is pressed;

FIG. 7 is a table showing a transition of the number of products in progress when the selection button 52 is pressed;

FIG. 8 is a table showing a transition of the number of products in progress when the selection button 53 is pressed;

FIG. 12 is a table showing a selection rule which algorithms to be selected;

FIG. 14 is a table showing the example numbers of products in progress;

FIG. 15 is a table showing the example numbers of required time;

FIG. 23 is a table showing a transition of the number of products in progress when the FIFO method is used to determine the priority order; and FIG. 24 is a table showing a transition of the number of products in progress when the LBFS method is used to determine the priority order.

DETAILED DESCRIPTION OF THE EMBODIMENTS

Preferred embodiments of the present invention will now be explained below in detail with reference to the accompanying drawings.

Figure 1:
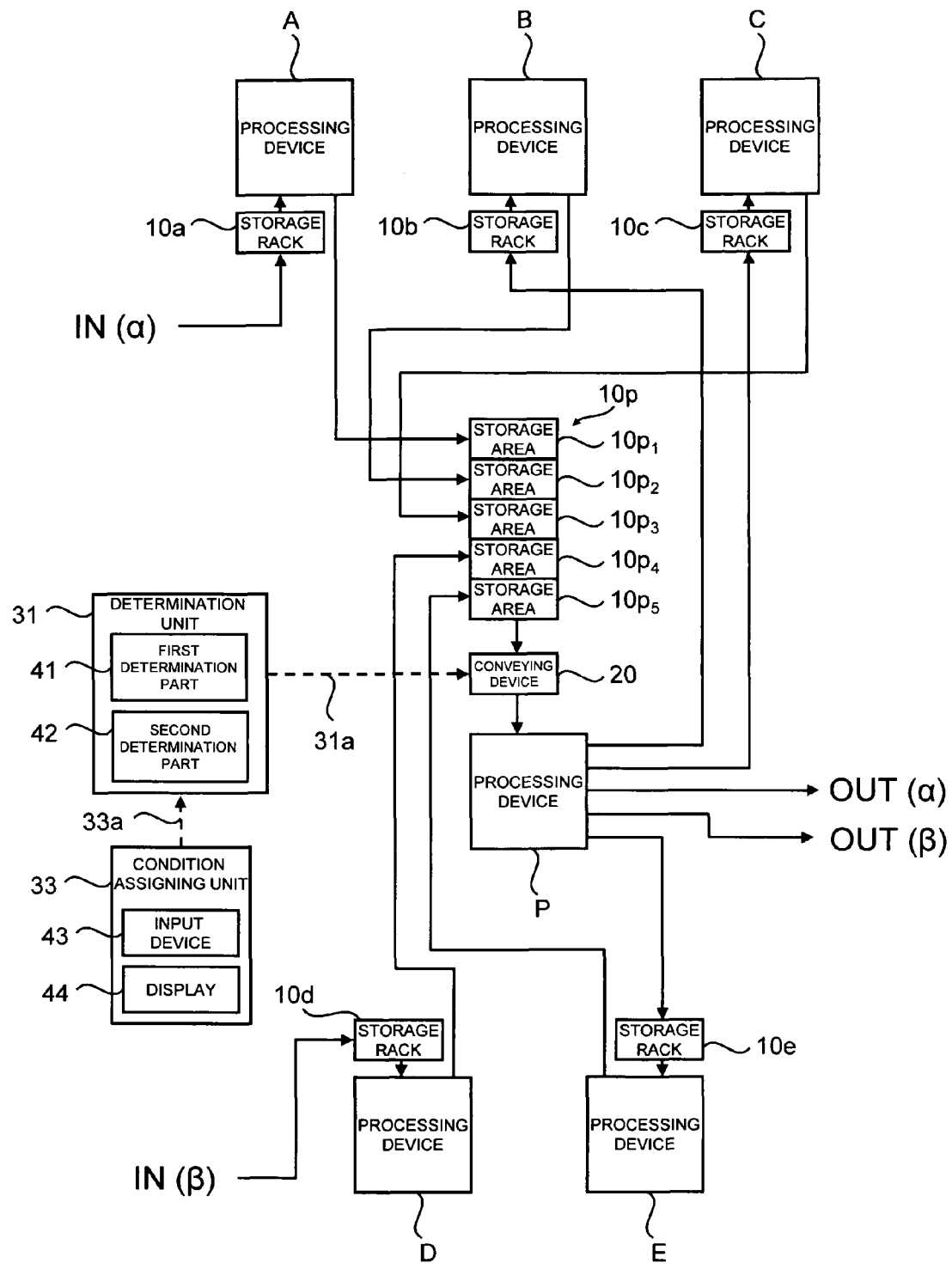
FIG. 1 is a schematic diagram showing a production line introduced with a production management system according to a first embodiment of the present invention.

FIG. 1 is a schematic diagram showing a production line introduced with a production management system according to the first embodiment of the present invention. In FIG. 1, arrowheads of solid lines indicate flows of products in progress, and arrowheads of broken lines indicate flows of signals.

Although not particularly limited, production lines shown in FIG. 1 are the production lines of semiconductor chips, and are what are called job-shop production lines. To facilitate the understanding, there are only six kinds of processing devices A, B, C, D, E, and P that constitute the production line, like in the example shown in FIGS. 22A to 22C. It is assumed that, in the production line, the product α is completed in six processes including the process 11 to the process 16, and the product β is completed in four processes including the process 21 to the process 24. That is, the processing devices A, P, B, P, C, and P perform the process 11 to the process 16, respectively to produce the product α (see FIG. 22B), and the processing devices D, P, E, and P perform the process 21 to the process 24 to produce the product β (see FIG. 22C).

Figures 22A, 22B, 22C:
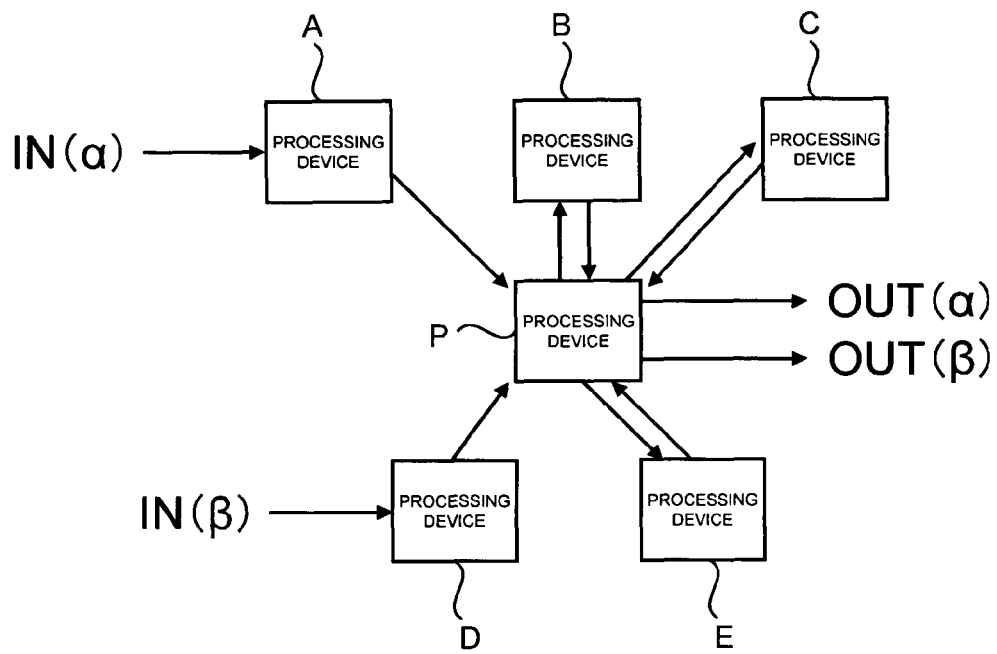
FIG. 22A is a schematic diagram showing processing devices to be used.
FIG. 22B is a table of the processing devices to be used to produce the product α, laid out in the order of the processes.
FIG. 22C is a table of the processing devices to be used to produce the product β, laid out in the order of the processes.

Like in the example shown in FIGS. 22A to 22C, the processing device P is repeatedly used in plural processes (the process 12, the process 14, the process 16, the process 22, and the process 24) among the six processing devices A, B, C, D, E, and P. These processes are key processes. As already explained, in the production line of semiconductor chips, the photolithography process becomes a key process in many cases. In this case, the processing device P is a stepper. The other processing devices A, B, C, D, and E are a cleaning device, a film formation device, an etching device, etc. Note that as to what specific devices these processing devices A, B, C, D, E, and P are is not directly relevant to the scope of the present invention, and they can be any devices.

As shown in FIG. 1, storage racks 10a to 10p are allocated to the processing devices A, B, C, D, E, and P, respectively. These storage racks 10a to 10p store products in progress (semiconductor wafers) to be processed by the corresponding processing devices A, B, C, D, E, and P. Therefore, the products in progress stored in the storage racks 10a to 10e are the products in progress positioned before the process 11, the process 13, the process 15, the process 21, and the process 23 that use the processing devices A, B, C, D, and E, respectively.

On the other hand, the products in progress stored in the storage rack 10p are the products in progress positioned before the processes that use the processing device P. However, because the processing device P performs in common the process 12, the process 14, the process 16, the process 22, and the process 24, storage areas need to be allocated in advance based on the processes to be performed. Accordingly, the storage rack 10p corresponding to the processing device P are allocated to five storage areas $10p_1$, $10p_2$, $10p_3$, $10p_4$, and $10p_5$. Products in progress conveyed from the processing devices A, B, C, D, and E are stored in the five storage areas $10p_1$, $10p_2$, $10p_3$, $10p_4$, and $10p_5$, respectively.

A conveying device 20 is laid out between the processing device P and the storage rack 10p. The conveying device 20 conveys any one of the products in progress stored in the five storage areas $10p_1$, $10p_2$, $10p_3$, $10p_4$, and $10p_5$, to the processing device P. A determination signal 31a supplied from a determination unit 31 determines which one of the products in progress should be conveyed. The determination unit 31 includes a first determination part 41 and a second determination part 42. The first determination part 41 determines a priority order between different kinds of products. The second determination part 42 determines a priority order within the same kind of product.

Figure 2:
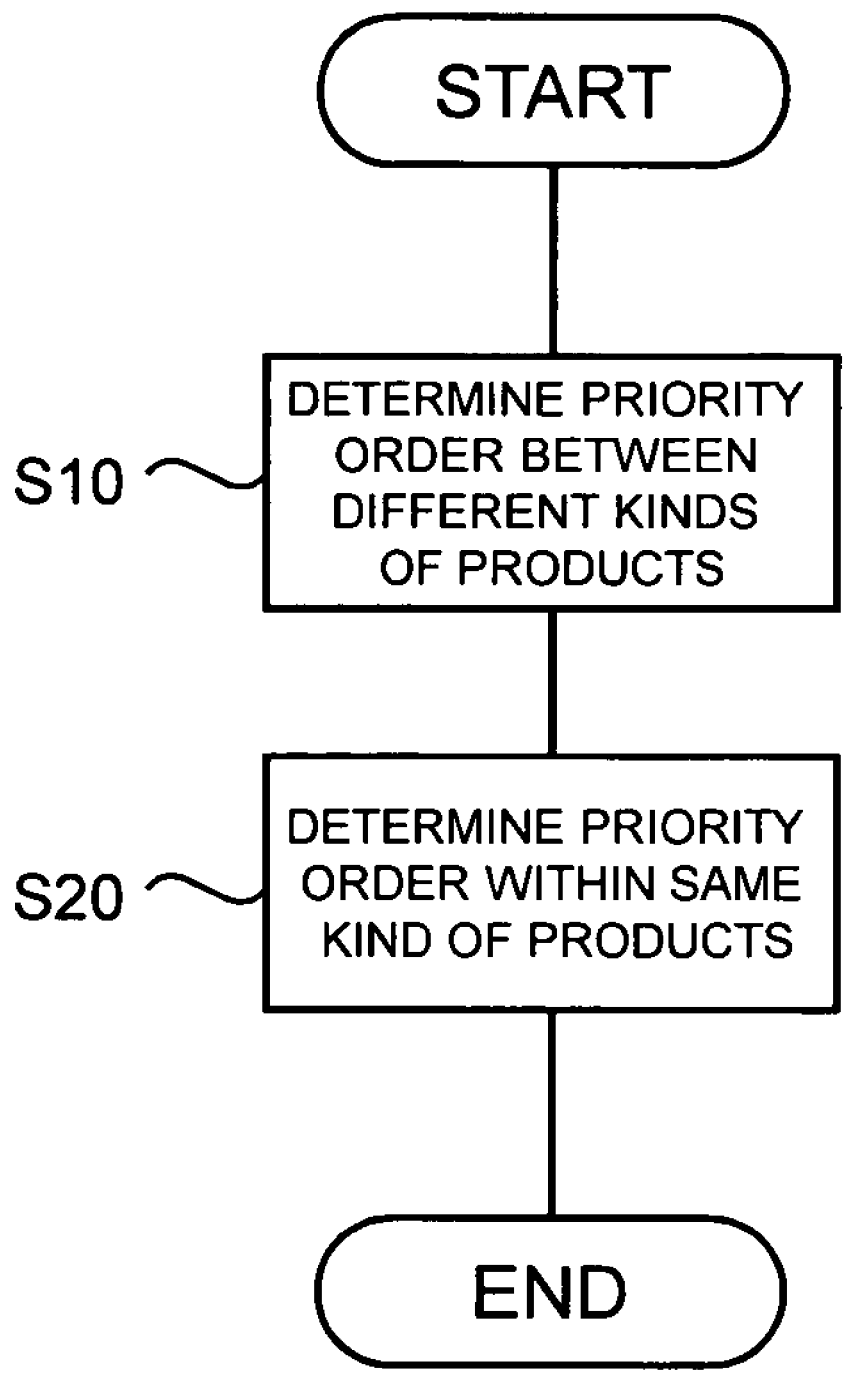
FIG. 2 is a flowchart for explaining the operation of the determination unit.

FIG. 2 is a flowchart for explaining the operation of the determination unit 31.

As shown in FIG. 2, the determination unit 31 first determines a work-in-process priority order of the key processes between different kinds of products, using the first determination part 41 (step S10). Next, the determination unit 31 determines a work-in-process priority order of the key processes within the same kind of products, using the second determination part 42 (step S20). In the example of the present embodiment, the determination unit 31 selects which one of the products α and β in progress to be processed by the processing device P, and next selects which one of the products in progress in which process among the processes corresponding to the selected kind of product.

More specifically, the first determination part 41 determines whether the product in progress within the storage areas $10p_1$, $10p_2$, and $10p_3$ corresponding to the product α is to be selected or a product in progress within the storage areas $10p_4$ and $10p_5$ corresponding to the product β is to be selected, among the products in progress stored in the storage rack 10p. On the other hand, the second determination part 42 determines which product in progress stored in which one of the storage areas $10p_1$, $10p_2$, and $10p_3$ is to be selected when the product α is selected, and determines which product in progress stored in which one of the storage areas $10p_4$ and $10p_5$ is to be selected when the product β is selected.

Figure 3:
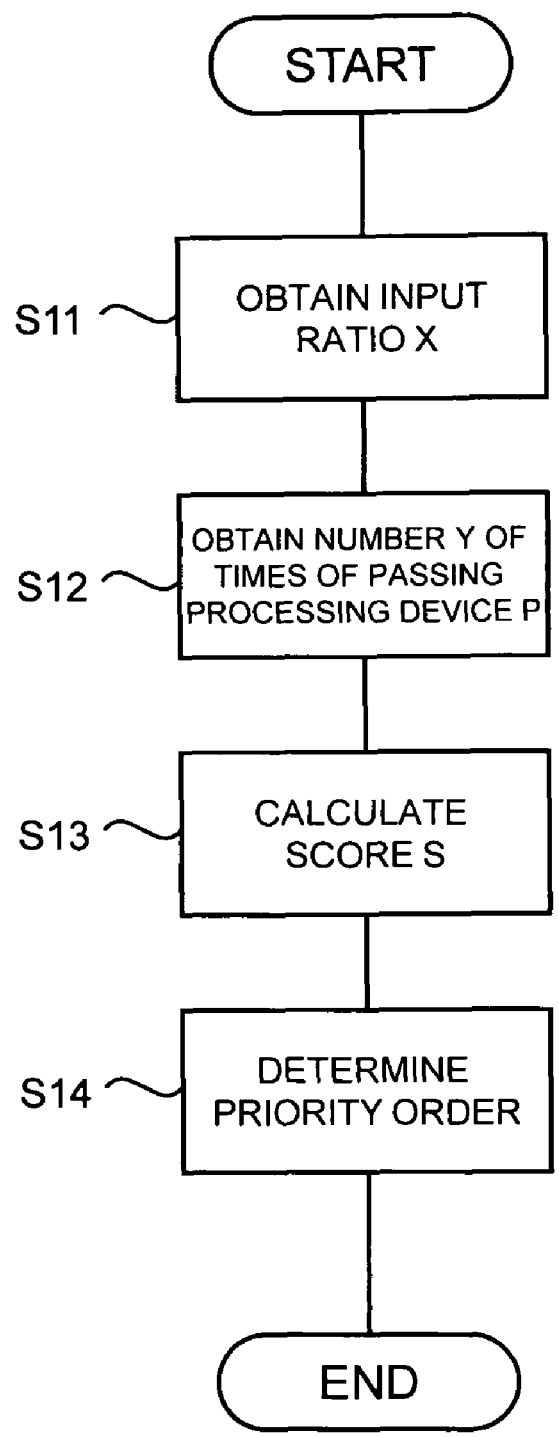
FIG. 3 is a flowchart for explaining a method of determining a priority order by the determination unit.

FIG. 3 is a flowchart for explaining a method of determining a priority order by the first determination part 41.

In determining a priority order of products, an input ratio X of each kind of product is obtained first (step S11). The input ratio X is a ratio of each kind of product among the total number of products that are input additionally per unit time. When there are two kinds of products α and β like in the present embodiment, two values of input ratios are obtained, including an input ratio $X_\alpha$ corresponding to the product $\alpha$ and an input ratio $X_\beta$ corresponding to the product $\beta$. While the method of obtaining the values is not particularly limited, the values can be obtained by counting the number of each kind of product input in the first storage rack. For example, the number of the product $\alpha$ can be obtained by counting the number of products input to the storage rack 10*a*, and the number of the product $\beta$ can be obtained by counting the number of products input to the storage rack 10*d*. Alternatively, when a production schedule is clear in advance, the operator can input the input ratio X based on this schedule.

Next, the number of times of performing the key process of each kind of product is obtained, that is, number Y of times of passing the processing device P is obtained (step S12). In the present embodiment, number $Y_\alpha$ of times when the product $\alpha$ passes the processing device P is three, and number $Y_\beta$ of times when the product $\beta$ passes the processing device P is two. These values can be obtained based on the input by the operator.

Next, the input ratio X is multiplied by the number Y of times of passing, for each kind of product, thereby calculating a score S of each kind of product (step S13) In the present embodiment, a score $S_\alpha$ of the product $\alpha$ is given by $X_\alpha Y_\alpha$, and a score $S_\beta$ of the product $\beta$ is given by $X_\beta Y_\beta$. The obtained score S represents priority of each kind of product. For example, when the input ratio $X_\alpha$ of the product $\alpha$ is three, and also when the input ratio $X_\beta$ of the product $\beta$ is two, the score $S_\alpha$ of the product $\alpha$ becomes $X_\alpha Y_\alpha = 3 \times 3 = 9$, and the score $S_\beta$ of the product $\beta$ becomes $X_\beta Y_\beta = 2 \times 2 = 4$.

The score S is a parameter representing the number of times of in-process per unit time of a key process of each kind of product. A work-in-process priority order of the key process between products is determined based on this score S (step S14).

The priority order based on the score S is preferably determined by setting the number of times of work in process per unit time of a key process of each kind of product, proportional to (or equal to) the score S of each kind of product. Specifically, in the above example, the product $\alpha$ in progress is passed nine times per unit time, and the product $\beta$ in progress is passed four times per unit time. According to this method, the work-in-process balance of the key process between products can be optimized.

Figures 4A, 4B, 4C:
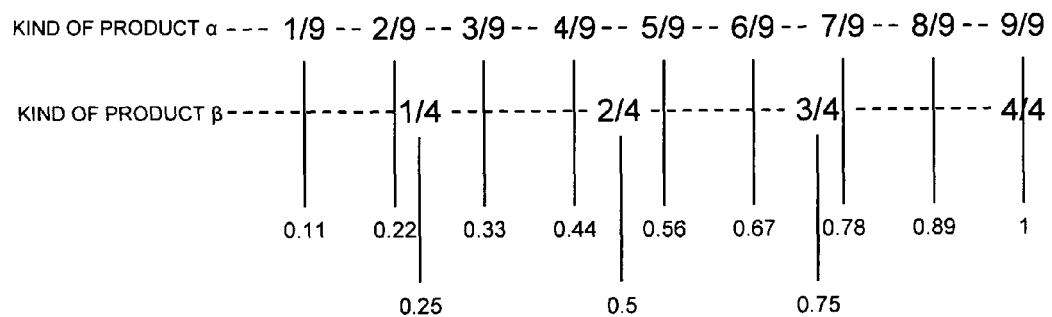
FIGS. 4A to 4C are diagrams for explaining a determination method of a priority order based on the score S.

The priority order based on the score S is most preferably determined by determining a work-in-process priority order of a key process of each kind of product, following a numeric value obtained by generating an arithmetic progression, using an inverse number (1/S) of the score as an increment for each kind of product. In the above example, as shown in FIG. 4A, an arithmetic progression including nine numeric values (1/9 to 9/9) is generated for the product $\alpha$, and an arithmetic progression including four numeric values (1/4 to 4/4) is generated for the product $\beta$. That is, the arithmetic progression having a first term and tolerance as 1/9 is generated for the product $\alpha$, and the arithmetic progression having a first term and tolerance as 1/4 is generated for the product $\beta$.

Next, the numeric values and the kinds of products obtained in this way are related to each other. As shown in FIG. 4A, the numeric values 1/9 to 9/9 are related to the product $\alpha$, and the numeric values 1/4 to 4/4 are related to the product $\beta$. These numeric values are arranged in the ascending order (or the descending order). The order of different kinds of products related to the arranged numeric value is set as a work-in-process order of the key processes.

Specifically, when the obtained numeric values are arranged in the ascending order, the order of the products related to the arranged numeric values becomes as shown in FIG. 4B. Therefore, in this case, the key processes are performed in the order shown in FIG. 4B. That is, the key processes are performed in the order of the product $\alpha$ related to the numeric value 1/9 ($\approx$0.11) the product $\alpha$ related to the numeric value 2/9 ($\approx$0.22), the product $\beta$ related to the numeric value 1/4 (=0.25) (and so on). After one cycle is finished, the process returns to the header numeric value 1/9, and the related product $\alpha$ is started. When the work-in-process order is determined in this way, the work-in-process balance of the key processes of different products can be optimized.

When the same numeric value is present among different products (for example, the numeric value 9/9 corresponds to the product $\alpha$, and the numeric value 4/4 corresponds to the product $\beta$), any product can be prioritized regarding this numeric value. Therefore, the key process can be performed in the order shown in FIG. 4C. In the example shown in FIG. 4B, the product $\beta$ related to the numeric value 4/4 (=1) is prioritized over the product $\alpha$ related to the numeric value 9/9 (=1). In the example shown in FIG. 4C, the product $\alpha$ related to the numeric value 9/9 (=1) is prioritized over the product $\beta$ related to the numeric value 4/4 (=1).

The method of determining a priority order of products by the first determination part 41 is as explained above.

On the other hand, the second determination part 42 determines a work-in-process priority order of key processes within the same kind of product. In the example of the present embodiment, the second determination part 42 determines which product in progress stored in which one of the storage areas 10*p*$_1$, 10*p*$_2$, and 10*p*$_3$ is to be selected when the product $\alpha$ is selected, and determines which product in progress stored in which one of the storage areas 10*p*$_4$ and 10*p*$_5$ is to be selected when the product $\beta$ is selected.

The method of determining a priority order by the second determination part 42 is not particularly limited, and an algorithm can be selected based on an instruction of the operator. That is, the production management system according to the present embodiment includes a condition assigning unit 33, and the operator manually selects an algorithm. The condition assigning unit 33 includes an input device 43 such as a keyboard and a mouse, and a display 44.

Figure 5:
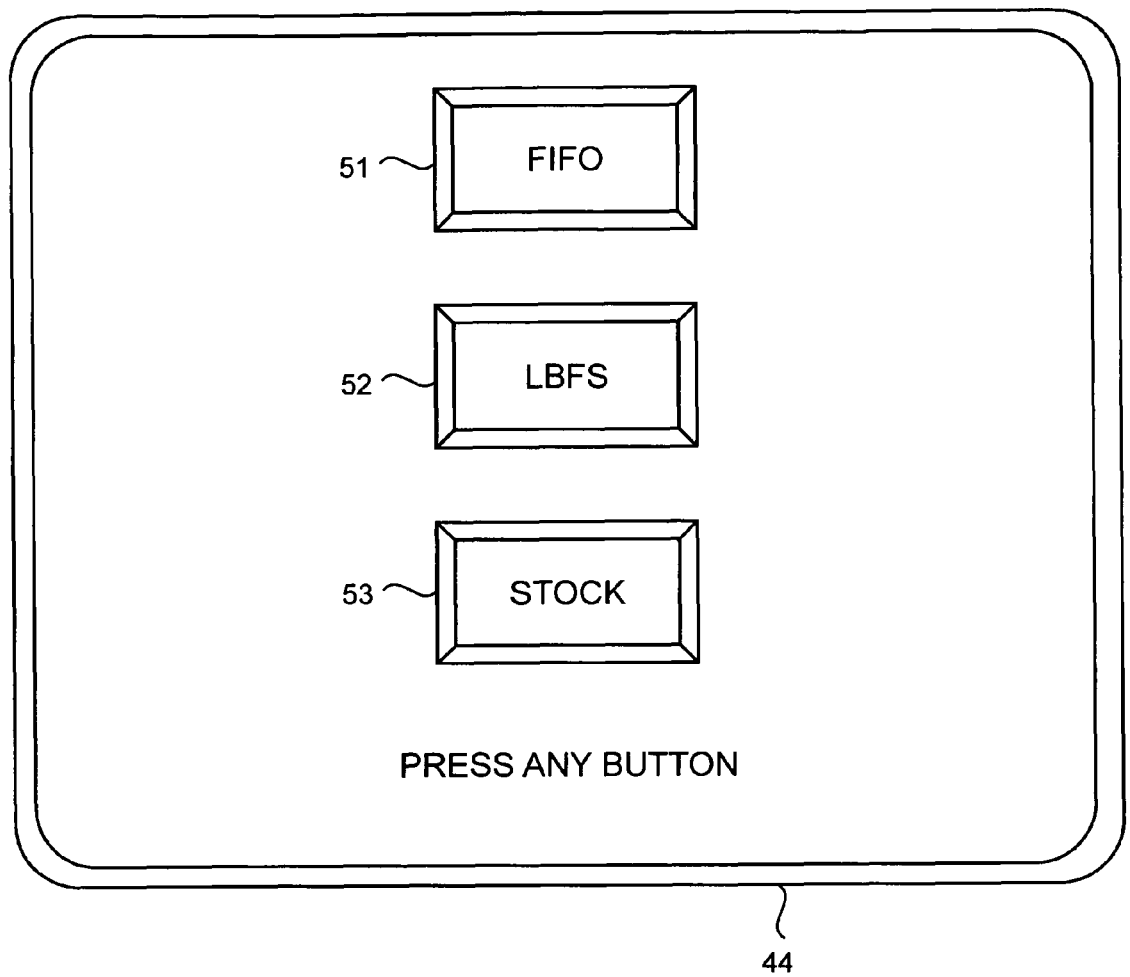
FIG. 5 is one example of a selection screen displayed on the display.

FIG. 5 is one example of a selection screen displayed on the display 44.

As shown in FIG. 5, when the operator selects a calculation algorithm of the order within the same kind of product, the display 44 included in the condition assigning unit 33 displays three selection buttons 51 to 53 that are exclusively selected. The selection button 51 displays "FIFO". The button 51 is pressed at the time of determining an order of products within the same kind of product by the FIFO method. The selection button 52 displays "LBFS". The button 52 is to be pressed when the order of products within the same kind of product is determined by the LBFS method.

On the other hand, "STOCK" is displayed on the selection button 53. This button 53 is pressed at the time of prioritizing a key process having a largest number of products in progress present immediately before. When there are plural key processes having a largest number of products in progress present immediately before, a priority order can be determined by the LBFS method.

FIG. 6 is a table showing a transition of the number of products in progress when the selection button 51 is pressed. As described above, when the selection button 51 is pressed, the order of products within the same kind of product is determined by the FIFO method.

In the example shown in FIG. 6, conditions are matched with the conditions shown in FIG. 23, to make it possible to compare this method with the conventional technique. That is, it is assumed that three lots of the product α are present immediately before the process 12, and two lots of the product β are present immediately before the process 22. The operation time of the key process using the processing device P is one day, and the operation time of the process using other processing device is zero day.

In this state, when the priority order of products within the same kind of product is determined based on the FIFO method, the products in progress shift as shown in FIG. 6. The work-in-process order of different kinds of products is ααβααβ, . . . as shown in FIG. 4B (or FIG. 4C) as described above (the same applies to the subsequent explanations). When products are shifted in this order, as shown in FIG. 6, after four days pass, three lots of the product α are present immediately before the process 14, and one lot of the product β is present immediately before the process 22 and immediately before the process 24, respectively.

In this case, a work-in-process variance (σ) from the initial state until a lapse of four days is 0.96, and the number of finished lots is zero. As explained above, when the selection button 51 is pressed, the work-in-process variance (σ) becomes smaller than the conventional variance, and the number of products in progress can be equalized.

FIG. 7 is a table showing a transition of the number of products in progress when the selection button 52 is pressed. As described above, when the selection button 52 is pressed, the order of products within the same kind of product is determined by the LBFS method.

In the example shown in FIG. 7, conditions are also matched with the conditions shown in FIG. 24, to make it possible to compare this method with the conventional technique. A priority order of the key process is defined such that the process 16 has a highest priority, and the process 24, the process 14, the process 22, and the process 12 have priorities in this order. In this case, the products in progress shift as shown in FIG. 7. After four days pass, three lots of the product α are present immediately before the process 12, and one lot of the product β is present immediately before the process 22 and immediately before the process 24, respectively.

In this case, a work-in-process variance (σ) from the initial state until a lapse of four days is 0.96, and the number of finished lot is one. As explained above, when the selection button 52 is pressed, the work-in-process variance (σ) becomes smaller than the conventional variance, and the number of products in progress can be equalized. Furthermore, finished lots can be obtained at an early stage.

FIG. 8 is a table showing a transition of the number of products in progress when the selection button 53 is pressed. As described above, when the selection button 53 is pressed, a key process having a largest number of products in progress present immediately before is selected.

In the example shown in FIG. 8, after four days pass, one lot of product is present immediately before each key process. In this case, a work-in-process variance (σ) from the initial state until a lapse of four days is 0.72, and the number of finished lot is zero. As explained above, when the selection button 53 is pressed, the work-in-process variance (σ) can be minimized.

As explained above, according to the production management system of the present embodiment, the number of times of work in process per unit time of a key process of each kind of product is determined, based on the score S calculated for each king of product. Therefore, the work-in-process balance of the key processes of different kinds of products can be equalized. Particularly, as explained with reference to FIG. 4, when the work-in-process order of the key processes of different kinds of products is determined in the order of obtained numeric values by generating an arithmetic progression, using 1/S as an increment for each kind of product, the work-in-process balance of key processes of different kinds of products can be further equalized.

On the other hand, while the method of determining the priority order of work in process of key processes within the same kind of product is not particularly limited, the work-in-process balance of key processes of the same kind of product can be also equalized when a key process having a largest number of products in progress present immediately before is selected by priority as explained by using FIG. 8.

A second embodiment of the present invention is explained next.

Figure 9:
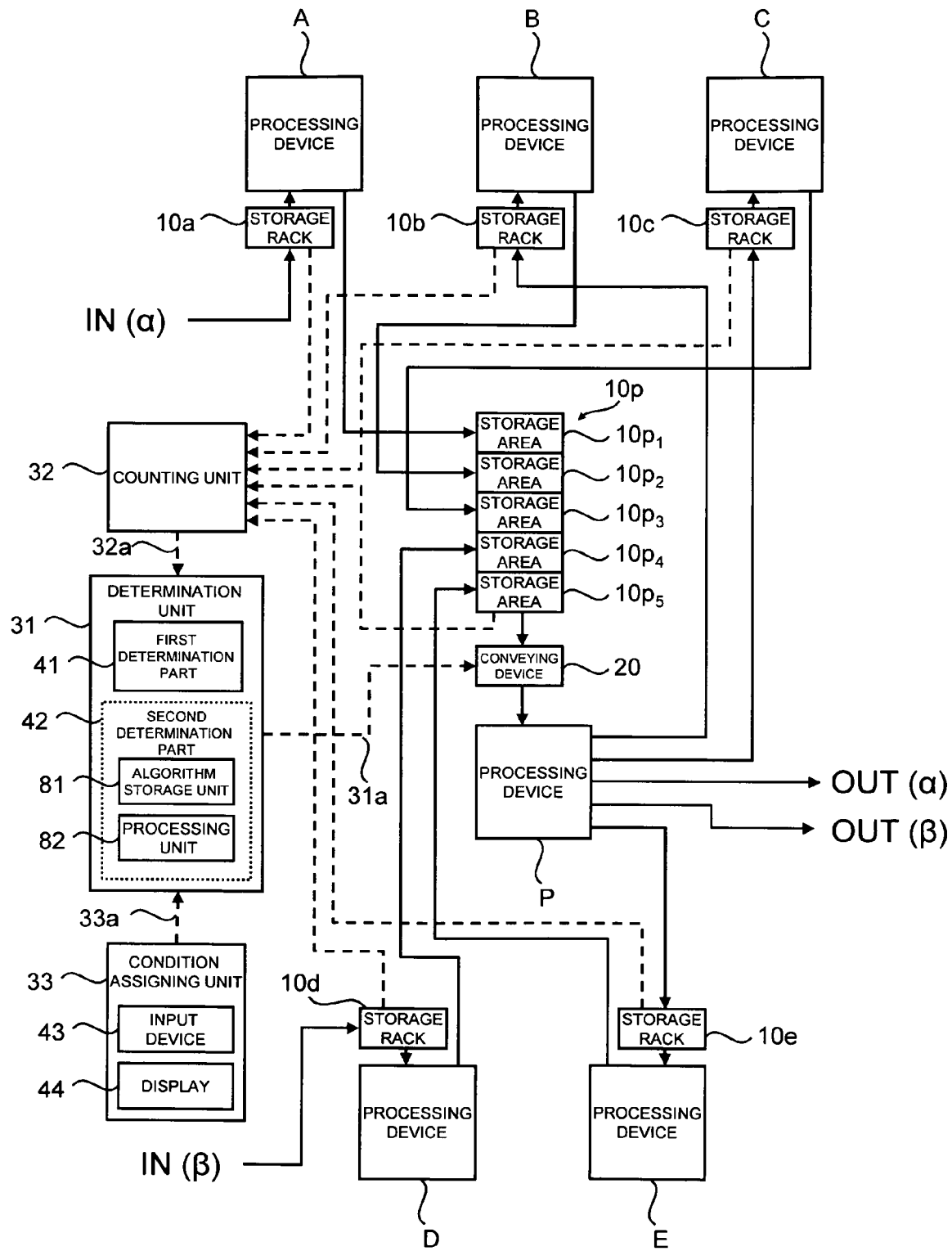
FIG. 9 is a schematic diagram showing a production line introduced with a production management system according to a second embodiment of the present invention.

FIG. 9 is a schematic diagram showing a production line introduced with a production management system according to the second embodiment of the present invention. As shown in FIG. 9, the production management system according to the present embodiment additionally includes a counting unit 32 in the production management system shown in FIG. 1. The second determination part 42 includes an algorithm storage unit 81 and a processing unit 82. Since other points are similar to those of the first embodiment, identical elements are assigned with like reference numerals and redundant explanations thereof will be omitted.

A method of determining a priority order of different kinds of products according to the present embodiment is the same as that of the first embodiment. However, a method of determining a priority order of products within the same kind of product according to the present embodiment is different from that of the first embodiment.

Figure 10:
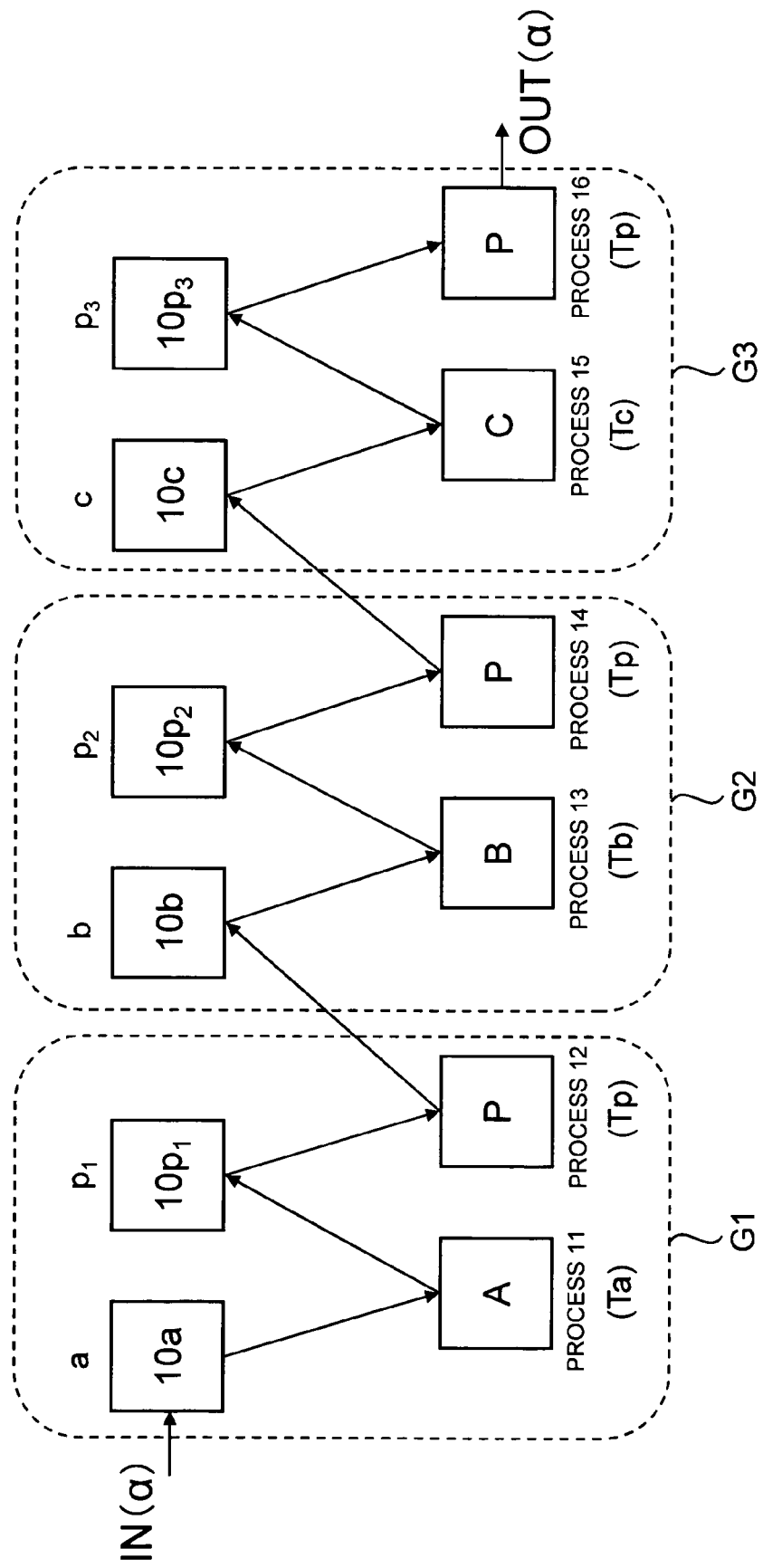
FIG. 10 is a diagram showing a classification of products α in progress into plural groups.

In the present embodiment, in determining a priority order of products within the same kind of product, a series of processes of a production line are classified into plural groups based on a key process. The processes are grouped, such that the end of a key process to the next key process is one group. Therefore, the manufacturing process of the product α is classified as shown in FIG. 10, where a process before the first process (the process 11) to a first key process (the process 12) is a group G1, a process after the first key process (the process 12) to a second key process (the process 14) is a group G2, and a process after the second key process (the process 14) to a last key process (a third key process: the process 16) is a group G3. Although not shown in the drawing, a manufacturing process of the product β is also grouped in a similar manner.

On the other hand, the counting unit 32 is a device that counts the number of products in progress stored in the storage racks 10a to 10e and 10p. The counting unit 32 can count the number of products in progress for the storage racks 10a to 10e and for the storage racks 10$p_1$ to 10$p_5$, respectively. Therefore, in this case, count data 32a as the output of the counting unit 32 represents the number of products in progress in each storage rack and each storage area. However, it is not essential that the counting unit 32 can obtain the number of products in progress in each storage rack and each storage area. It is sufficient that the counting unit 32 can obtain at least the number of products in progress in each group. In this case, the count data 32a as the output of the counting unit 32 represents the number of products in progress in each group. While a detailed configuration of the counting unit 32 is not particularly limited, counters attached to the storage racks 10a to 10e and 10p can be used.

Figure 11:
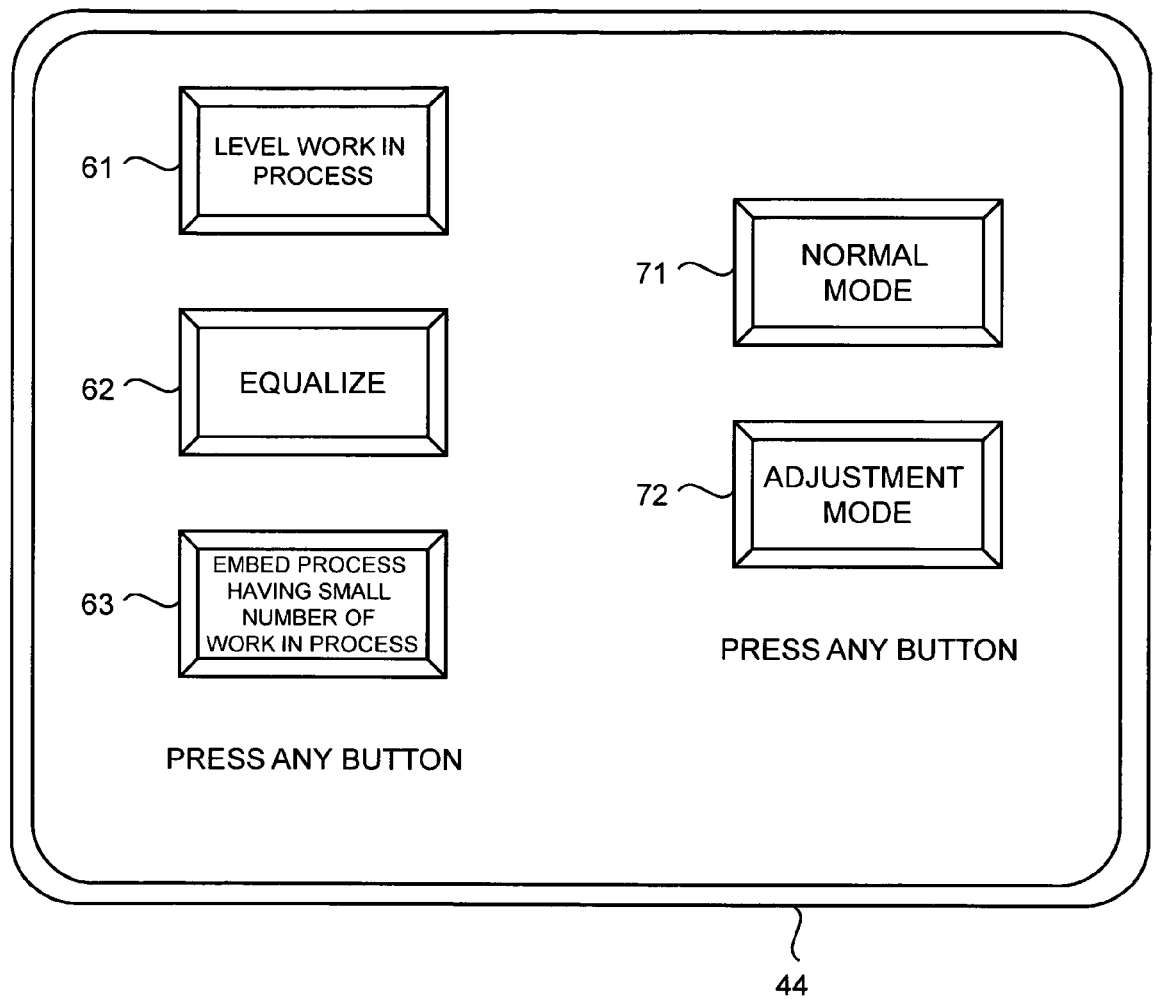
FIG. 11 is one example of a selection screen displayed on the display.

FIG. 11 is one example of a selection screen displayed on the display 44.

As shown in FIG. 11, the display 44 indicates exclusively-selected three selection buttons 61 to 63. The selection button 61 is displayed with "level work in process". This button 61 is pressed when it is desired to place highest priority to alleviation of a state that a large number of products in progress are accumulated in the key processes (the process 12, the process 14, the process 16, the process 22, and the process 24). The selection button 62 is displayed with "equalize". This button 62 is pressed when it is desired to place highest priority to equalize a number of products in progress accumulated before each process as a whole. The selection button 63 is displayed with "embed process having small number of work in process". This button 63 is pressed when it is desired to place highest priority to increasing the number of products in progress of a process when the process has a small number of products in progress.

The display 44 is also displayed with exclusively-selected two selection buttons 71 and 72. The selection button 71 is displayed with "normal mode". This button 71 is pressed when there is no large difference in numbers of products in progress between groups in the normal state, when the processes are grouped based on the key process.

The "when there is no large difference in numbers of products in progress between groups in the normal state" corresponds to a case where required processing times of groups are substantially the same or there is no large difference in the required processing times between groups. When there is a large difference in required processing times between groups, the whole groups become a bottleneck. Therefore, usually, a production line is designed so that the required processing times of the groups become substantially the same. Accordingly, this "normal mode" is usually selected.

On the other hand, the selection button 72 is displayed with "adjustment mode". This button 72 is pressed when there is a large difference in numbers of products in progress between groups in the normal state, when the processes are grouped based on the key process. The "when there is a large difference in numbers of products in progress between groups in the normal state" corresponds to a case where there is a certain difference in the required processing times between groups. As described above, usually, a production line is designed so that required processing times of groups are substantially the same. However, actually, there arises a difference in the required processing times between groups due to a trouble in a device, and so on. In this case, the "adjustment mode" is selected.

When the selection buttons 61 to 63 and the selection buttons 71 and 72 are displayed on the display 44, the operator presses any one of the selection buttons 61 to 63, and presses any one of the selection buttons 71 and 72 using a mouse and the like. When the operator has selected conditions in this way, a selected result is supplied to the second determination part 42 within the determination unit 31, as condition data 33a.

The operator selects conditions by pressing any one of the three selection buttons 61 to 63 and pressing any one of the two selection buttons 71 and 72, as described above, thereby selecting any one of six conditions shown in FIG. 12. These six conditions correspond to six calculation algorithms (first to sixth algorithms) respectively stored in the algorithm storage unit 81. The processing unit 82 calculates the count data 32a supplied from the counting unit 32, using a selected calculation algorithm, thereby generating the determination signal 31a.

A detailed calculation algorithm of the determination signal 31a is explained next.

Figure 13:
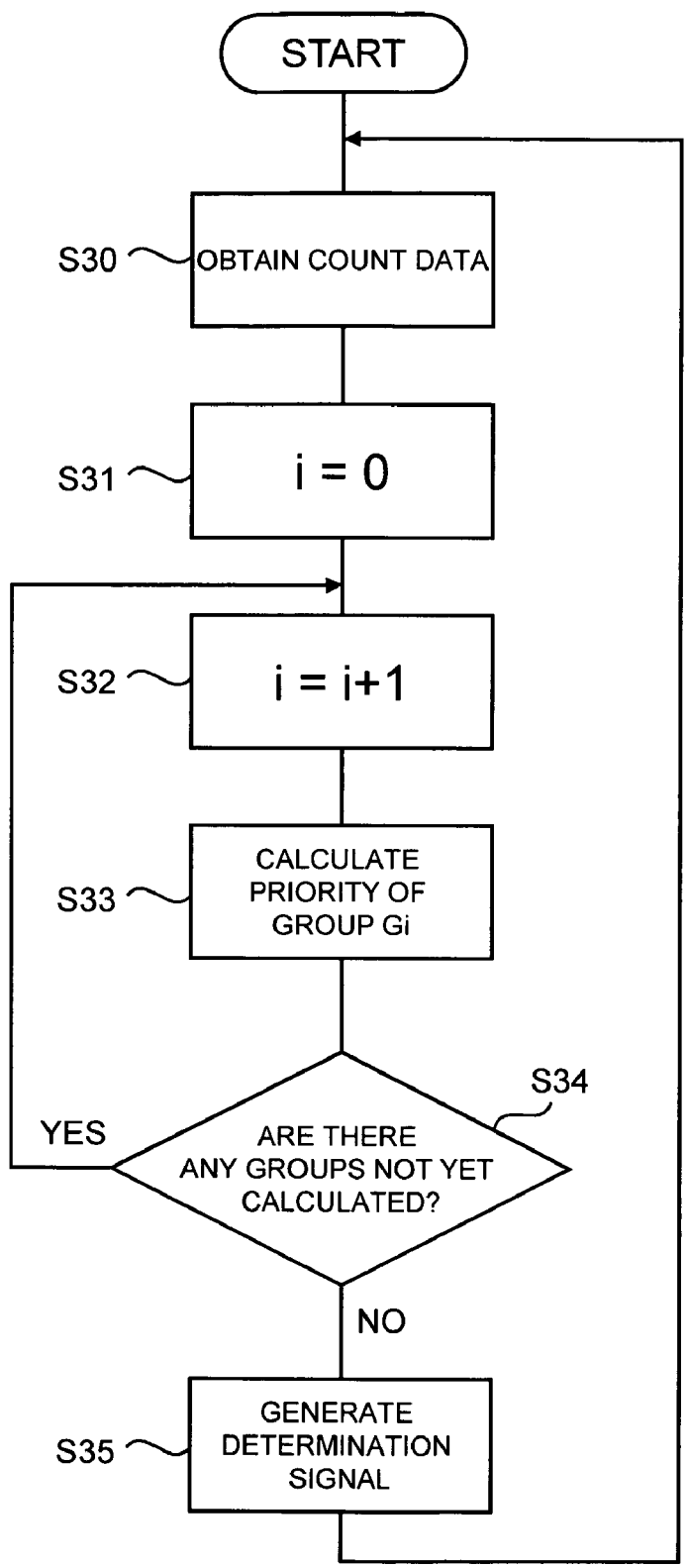
FIG. 13 is a common flowchart showing a calculation algorithm.

FIG. 13 is a common flowchart showing a calculation algorithm.

As shown in FIG. 13, the processing unit 82 within the second determination part 42 obtains the count data 32a supplied from the counting unit 32 (step S30). The count data 32a can be obtained by requesting the counting unit 32 for the count data 32a, or the count data 32a periodically or always supplied from the counting unit 32 can be obtained at a predetermined timing.

Next, a variable i is reset to zero (step S31), and the variable i is incremented (step S32). This variable i is used to assign the groups G1 to G3. In this case, the variable i becomes equal to one by the increment at step S32. Therefore, the group G1 is assigned.

Next, priority of the group G1 is calculated (step S33). A calculation equation of priority is different depending on a selected algorithm, and this is explained in detail later.

The processing unit 82 judges whether there remains a group of which priority has not yet been calculated (step S34). When there remains a group of which priority has not been calculated (step S34: YES), the process returns to step S32, and the variable i is incremented. After priorities of all groups (the group G1 to G3) are completed (step S34: NO), the determination signal 31a is generated based on the priority of each group (step S35). The determination signal 31a is generated by selecting a group having a highest priority (having a largest numeric value obtained), and a group indicated by the determination signal 31a has a highest priority.

The determination signal 31a generated in this way is supplied to the conveying device 20 as shown in FIG. 9. Upon reception of the determination signal 31a, the conveying device 20 conveys to the processing device P a product in progress from the storage areas $10p_1$ to $10p_5$ corresponding to a group having a highest priority order among the selected kind of product. For example, in the state that the product α is selected, when the determination signal 31a indicates that the group G1 has a highest priority, a product in progress is conveyed to the processing device P from the storage area $10p_1$ included in the group G1, among the storage areas $10p_1$ to $10p_3$.

After step S35 is completed, the process returns to step S30, and the count data 32a is obtained again. Preferably, the count data 32a is obtained again after a lapse of a certain period using a timer or the like.

Next, a method of calculating priority (step S33) is explained for each algorithm. In the following explanation, as shown in FIG. 10, numbers of products in progress stored in the storage racks 10a, 10b, and 10c are expressed as "a", "b", and "c", respectively, and numbers of products in progress stored in the storage area $10p_1$ to $10p_3$ are expressed as "p1", "p2", and "p3", respectively. Numbers of products in progress included in the groups G1, G2, and G3 are expressed as "g1", "g2", and "g3", respectively. The numbers of products in progress are defined as follows:

$g1 = a + p1$ $g2 = b + p2$ $g3 = c + p3$.

When a processing device is also included in each group, the numbers of products in progress in process should also be counted in the numbers of products in progress of the groups "g1", "g2", and "g3". However, the numbers of products in progress in process are considered to be sufficiently smaller than the numbers of products in progress accumulated in the storage racks 10a to 10c and 10p. Therefore, in the present embodiment, the numbers of products in progress in process are not included in "g1", "g2", and "g3". The numbers of products in progress in process can be certainly included in "g1", "g2", and "g3".

A case where a first algorithm is selected is explained first.

The first calculation algorithm is selected when the selection button 61 displayed with "level work in process" and the selection button 71 displayed with "normal mode" are pressed, as shown in FIG. 12.

When the first algorithm is selected, priority Qi calculated at step S33 is performed as Qi=gi, where "gi" is the number of products in progress included in the group to be calculated. Qi designates priority corresponding to the group G1 to be calculated. Therefore, in the present embodiment, three priorities of Q1, Q2, and Q3 are calculated.

When the first algorithm is selected, and when a detailed number of products in progress is as shown in FIG. 14, for example, priorities become as follows:

$Q1=18$ $Q2=9$ $Q3=13$.

Because the priority Q1 is highest, the group G1 corresponding to this priority is selected at step S35 shown in FIG. 13. That is, the determination signal 31*a* which is output by the determination unit 31 assigns the group G1. In response to this, the conveying device 20 conveys the product in progress from the storage area 10$p_1$ to the processing device P.

When the priority within a kind of product is calculated following this algorithm, the processing device P performs the key process by prioritizing the product in progress corresponding to the group having a largest number of products in progress. Therefore, accumulating of a large number of products in progress in the key process can be alleviated. That is, work in progress can be effectively leveled.

Next, a case where a second algorithm is selected is explained.

The second calculation algorithm is selected when the selection button 61 displayed with "level work in process" and the selection button 72 displayed with "adjustment mode" are pressed, as shown in FIG. 12.

When the second algorithm is selected, a time required to process one product in progress by each processing device (processing time required per one semiconductor wafer) is considered. That is, when a time required for each of the processing devices A, B, C, and P to process one product in progress is Ta, Tb, Tc, and Tp, respectively, a time TG1 necessary to complete the processes 11 and 12 corresponding to the group G1 is defined as: TG1=Ta+Tp.
Similarly, a time TG2 necessary to complete the processes 13 and 14 corresponding to the group G2 is defined as: TG2=Tb+Tp.
Time TG3 necessary to complete the processes 15 and 16 corresponding to the group G3 is defined as: TG3=Tc+Tp.

When the second algorithm is selected, the above processing time is considered. Specifically, when a required time corresponding to the group to be calculated is "TGi", priority is calculated by Qi=gi/TGi.

When the number of products in progress and required time are as shown in FIG. 14 and FIG. 15, for example, priorities are as follows:

$Q1=7.2(=18/2.5)$ $Q2=4.5(=9/2)$ $Q3\approx8.7(=13/1.5)$

Because the priority Q3 is the highest, the group G3 corresponding to Q3 is selected at step S35 shown in FIG. 13. That is, the determination signal 31*a* which is output by the determination unit 31 assigns the group G3. In response to this, the conveying device 20 conveys the product in progress from the storage area 10$p_3$ to the processing device P.

When the priority is calculated following this algorithm, even when a production line generates a large difference in the numbers of products in progress between the groups attributable to a difference of processing time, a proper group is selected considering this. That is, even when there is a large difference in the numbers of products in progress in the normal state between the groups, accumulating of a large number of products in progress in the key process can be alleviated.

Next, a case where a third algorithm is selected is explained.

The third calculation algorithm is selected when the selection button 62 displayed with "equalize" and the selection button 71 displayed with "normal mode" are pressed, as shown in FIG. 12.

When the third algorithm is selected, priority is calculated by considering not only the number of products in progress included in the group concerned but also the number of products in progress included in the next group. When the third algorithm is selected, priority is calculated by Qi=gi−g(i+1). In the above equation, "g (i+1)" represents the number of products in progress included in the next group. In the present embodiment, when i=3, this number can be g(i+1)=0 or g(i+1)=g1.

Specifically, when the CONWIP of additionally producing products by only a completed number of products is not considered, g(i+1)=0 is used, and when the CONWIP is considered, g(i+1)=g1 is used.

When the numeric values of products in progress are as shown in FIG. 14 and also when the CONWIP is considered, priorities are as follows:

$Q1=9(=18-9)$ $Q2=-4(=9-13)$ $Q3=-5(13-18)$

Because the priority Q1 is the highest, the group G1 corresponding to Q1 is selected at step S35 shown in FIG. 13. Therefore, the determination signal 31*a* which is output by the determination unit 31 assigns the group G1. In response to this, the conveying device 20 conveys the product in progress from the storage area 10$p_1$ to the processing device P.

When priority is calculated following this algorithm, products in progress corresponding to the group having a large number of accumulated products are processed, as compared with the number of products in progress accumulated in the next group. Therefore, the number of products in progress can be equalized. That is, a number of products in progress accumulated in each process can be equalized as a whole.

Next, a case where a fourth algorithm is selected is explained.

The fourth calculation algorithm is selected when the selection button 62 displayed with "equalize" and the selection button 72 displayed with "adjustment mode" are pressed, as shown in FIG. 12.

When the fourth algorithm is selected, a time required to process one product in progress by each processing device (processing time required per one semiconductor wafer) is considered, in addition to the third algorithm. That is, when the fourth algorithm is selected and also when the required time corresponding to the next group is "TG(i+1)", priority is calculated by Qi=(gi/TGi)−{g(i+1)/TG(i+1)}.

When the numeric values of goods in progress are as shown in FIG. 14 and FIG. 15, priorities are as follows:

$Q1=2.7(=7.2-4.5)$ $Q2\approx-4.2(\approx4.5-8.7)$ $Q3\approx1.5(\approx8.7-7.2)$.

Because the priority Q1 is the highest, the group G1 corresponding to Q1 is selected at step S35 shown in FIG. 13. The product in progress is conveyed from the storage area $10p_1$ to the processing device P.

When priority is calculated following this algorithm, the number of products in progress can be equalized, even when a production line generates a large difference in the numbers of products in progress between the groups due to a difference of processing time.

Next, a case where a fifth algorithm is selected is explained.

The fifth calculation algorithm is selected when the selection button 63 displayed with "embed a process having a small number of work in process" and the selection button 71 displayed with "normal mode" are pressed, as shown in FIG. 12.

When the fifth algorithm is selected, priority is calculated by considering the number of products in progress included in the next group, not the number of products in progress included in the group concerned. That is, when the fifth algorithm is selected, priority is calculated by $Qi=-g(i+1)$.
When i=3, and also when the CONWIP is not considered, priority is calculated as $g(i+1)=0$, and,
when the CONWIP is considered, priority is calculated as $g(i+1)=g1$.

When the numeric values of goods in progress are as shown in FIG. 14 and also when the CONWIP is considered, priorities are as follows:

$Q1=-9$ $Q2=-13$ $Q3=-18$

Because the priority Q1 is the highest, the group G1 corresponding to Q1 is selected at step S35 shown in FIG. 13. The product in progress is conveyed from the storage area $10p_1$ to the processing device P.

When priority is calculated following this algorithm, the next group having a smaller number of products in progress has high priority. That is, in the process having a small number of products in progress, the number of products in progress is controlled to increase. Therefore, a problem of a reduction in the operation rate due to zero number of products in progress in a certain process can be prevented.

Next, a case where a sixth algorithm is selected is explained.

The sixth calculation algorithm is selected when the selection button 63 displayed with "embed a process having a small number of work in process" and the selection button 72 displayed with "adjustment mode" are pressed, as shown in FIG. 12.

When the sixth algorithm is selected, a time required to process one product in progress by each processing device (processing time required per one semiconductor wafer) is considered, in addition to the fifth algorithm. That is, when the sixth algorithm is selected, priority is calculated by $Qi=-g(i+1)/TG(i+1)$.

When the number of products in progress and required time are as shown in FIG. 14 and FIG. 15, for example, priorities are as follows:

$Q1=-4.5(=-9/2)$ $Q2=-8.7(=-13/1.5)$ $Q3=-7.2(=-18/2.5)$

Because the priority Q1 is the highest, the group G1 corresponding to Q1 is selected at step S35 shown in FIG. 13. The product in progress is conveyed from the storage area $10p_1$ to the processing device P.

When priority is calculated following this algorithm, in the process having a small number of products in progress, a problem of a reduction in the operation rate due to zero number of products in progress can be prevented, even when a production line generates a large difference in the numbers of products in progress between the groups due to a difference of processing time.

While the process performed when the first determination part 41 selects the product α is explained above, a similar process is also performed when the product β is selected.

As explained above, according to the present embodiment, production lines are grouped by kinds of products based on the key processes. Priorities of key processes within the same kind of product are determined using numbers of products in progress for each group as parameters. Accordingly, priority based on the actual situation can be determined, thereby increasing production efficiency.

In the above embodiment, while the key process 16 is a final process of the product α is explained, a case where the final process is not the key process is explained.

Figure 16:
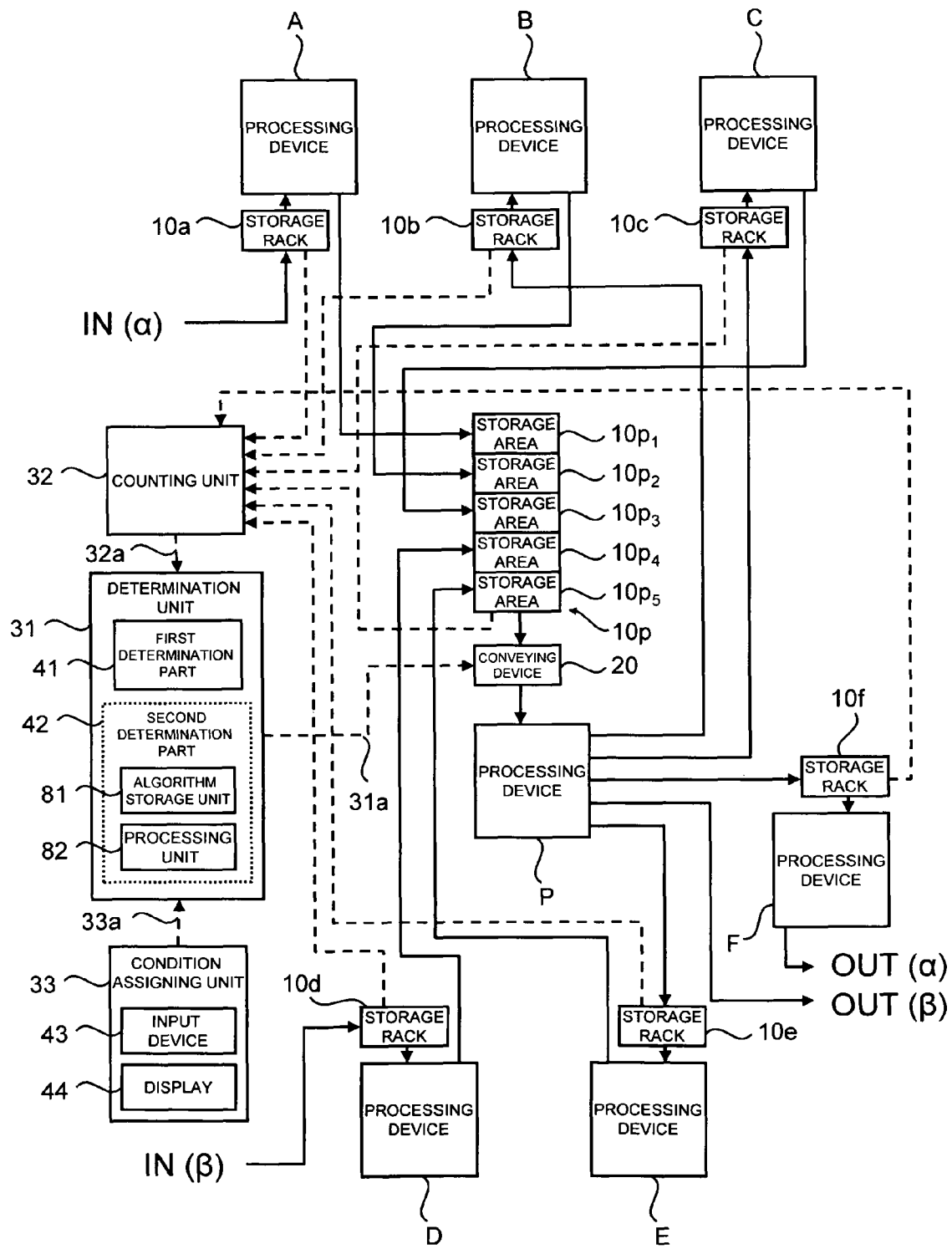
FIG. 16 is a schematic diagram showing a production line in which the final process is not a key process.

FIG. 16 is a schematic diagram showing a production line in which the final process is not a key process.

FIG. 16 is different from the production line shown in FIG. 9 in that a processing device F and a corresponding storage rack 10f are added to FIG. 9. Since other points are the same as those of the production line shown in FIG. 9, identical elements are assigned with like reference numerals and redundant explanations thereof will be omitted.

Figure 17:
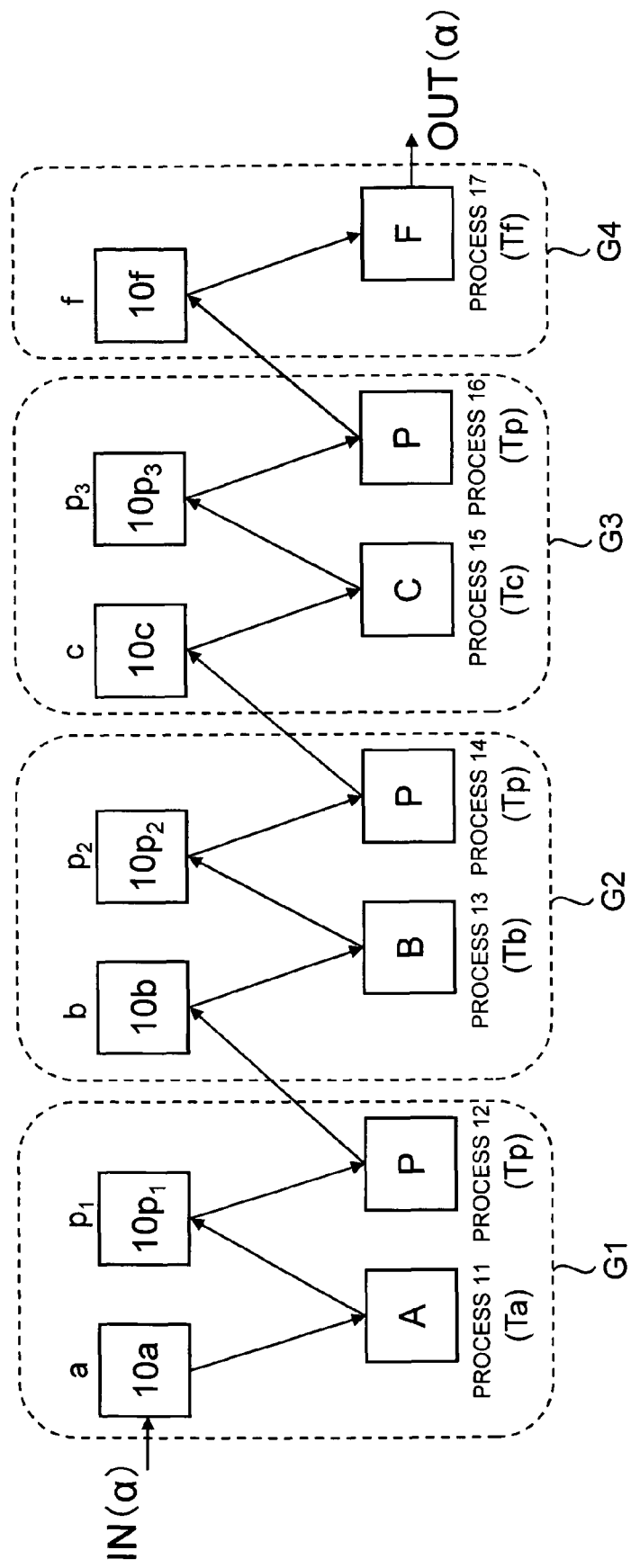
FIG. 17 is a diagram showing a classification of products α in progress into plural groups when the CONWIP is not considered.
Figure 18:
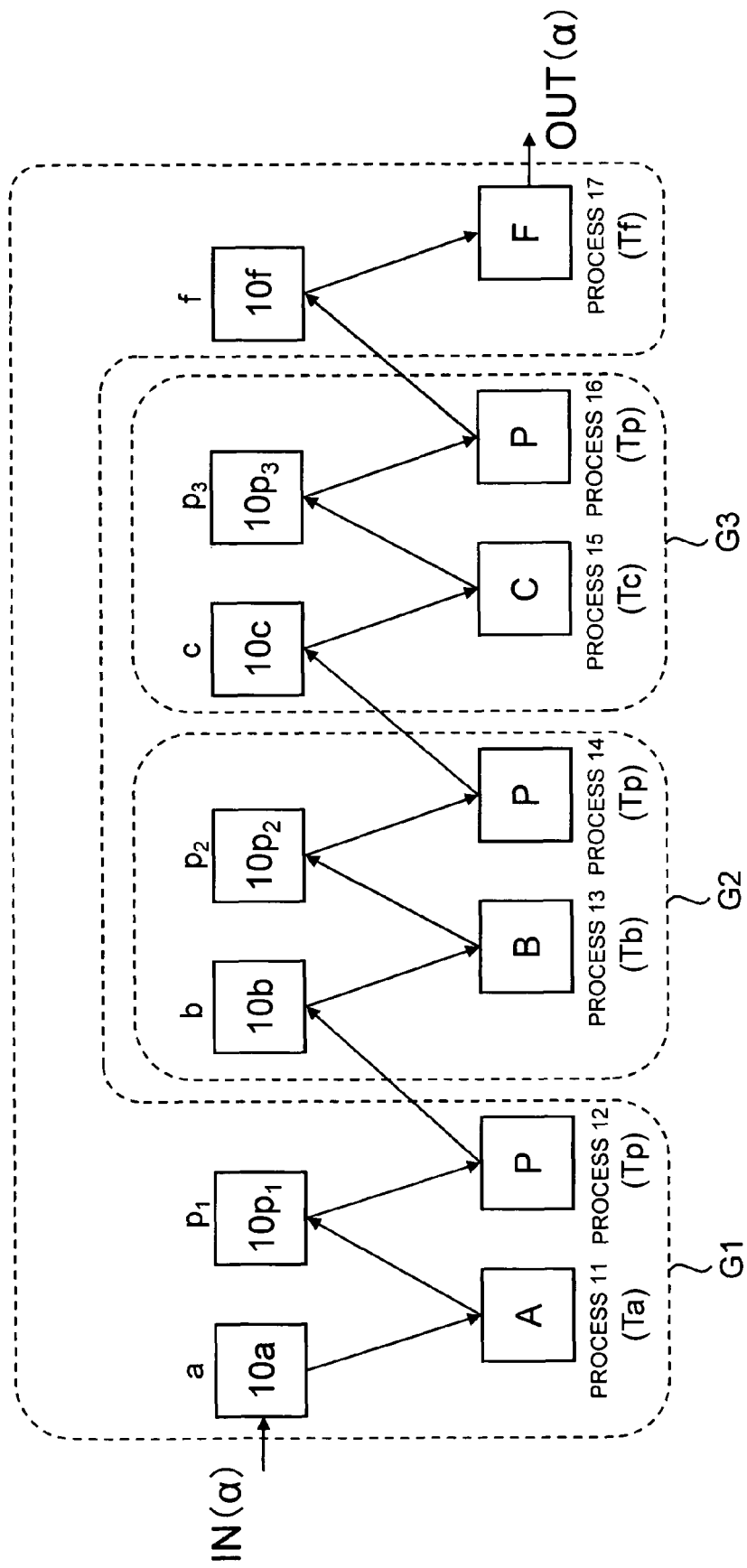
FIG. 18 is a diagram showing a classification of products α in progress into plural groups when the CONWIP is considered.

The processing device F performs a process 17 as a final process of the product α. The processing device F and the corresponding storage rack 10f can constitute a group G4 as shown in FIG. 17, or can constitute a part of the group G1 as shown in FIG. 18. Specifically, when the CONWIP is not considered, the configuration as shown in FIG. 17 can be used, and when the CONWIP is considered, the configuration as shown in FIG. 18 can be used.

While the operator manually selects a calculation algorithm in the above embodiment, the algorithm can be selected automatically or semi-automatically.

Figure 19:
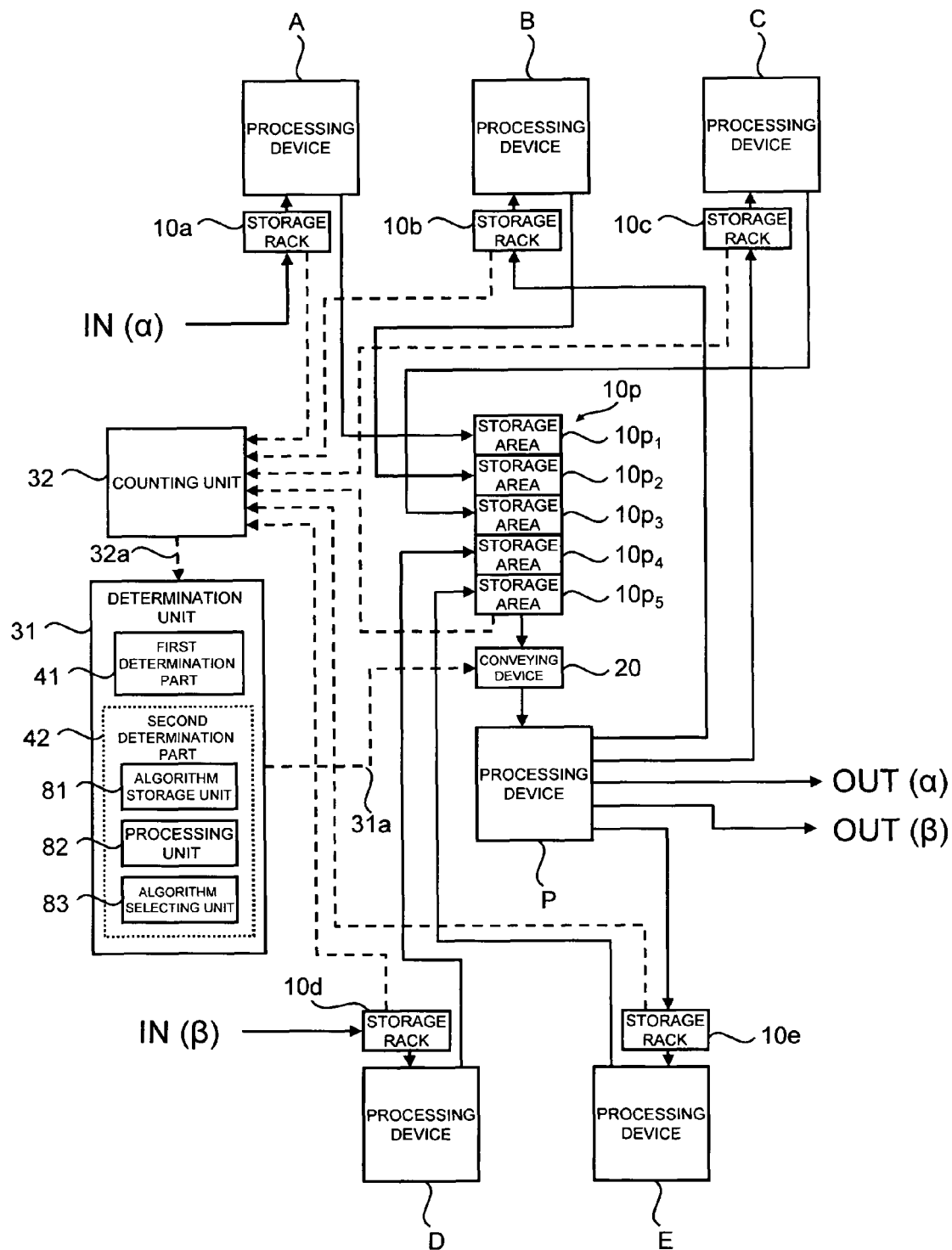
FIG. 19 is a schematic diagram showing a production line in which the calculation algorithm is selected automatically.

FIG. 19 is a schematic diagram showing a production line in which the calculation algorithm is selected automatically.

The production line shown in FIG. 19 is different from the production line shown in FIG. 9 in that an algorithm selecting unit 83 is added to the second determination part 42, in place of a deletion of the condition assigning unit 33. Since other points are the same as those of the production line shown in FIG. 9, identical elements are assigned with like reference numerals and redundant explanations thereof will be omitted.

The algorithm selecting unit 83 is used to select an algorithm which is most suitable to determine an order of products within the same kind of product based on the count data 32a supplied from the counting unit 32. The algorithm selecting unit 83 performs the following process to select an algorithm.

Figure 20:
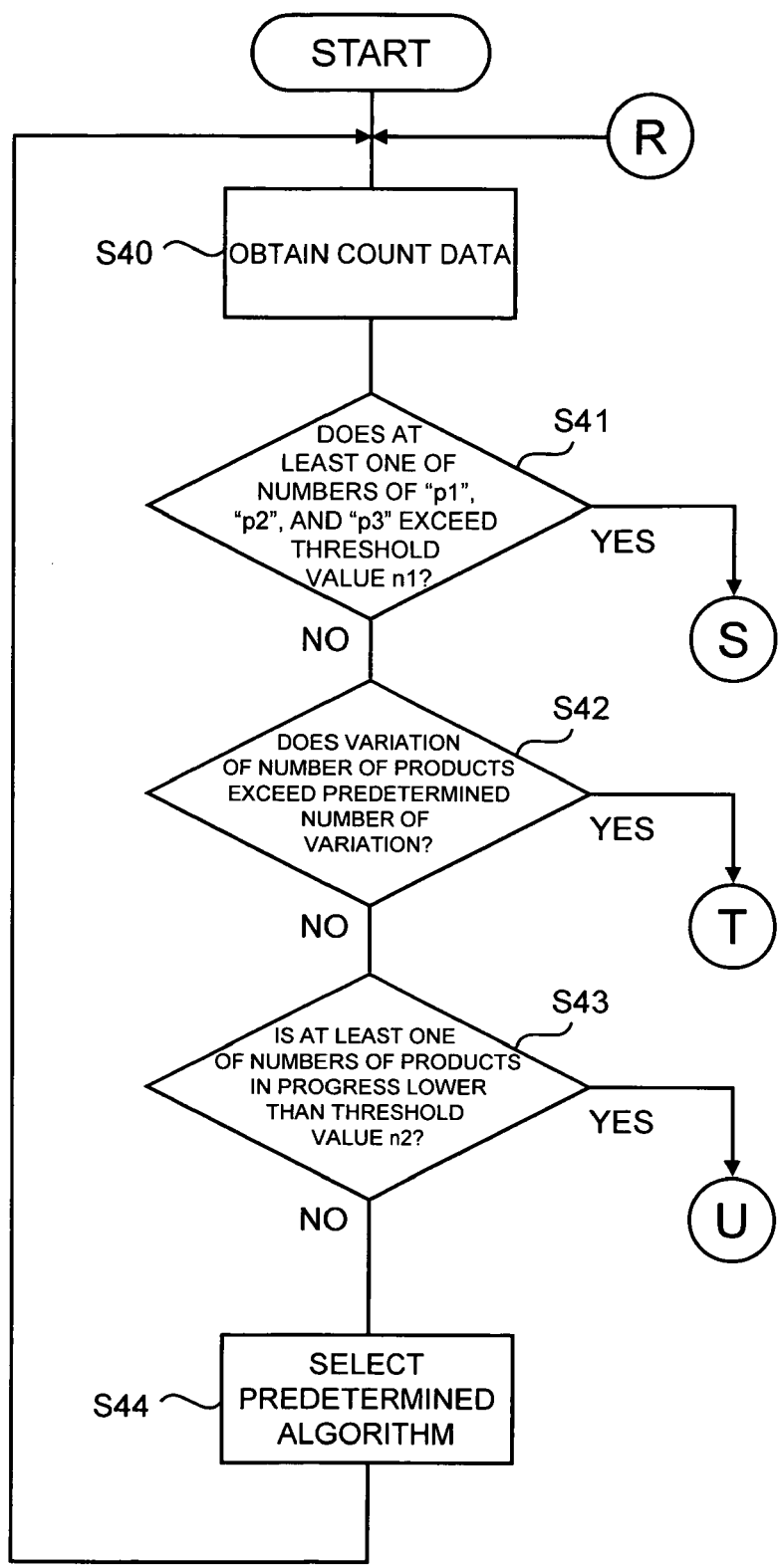
FIG. 20 is flowchart for explaining a part of a selection operation by the algorithm selecting unit.
Figure 21:
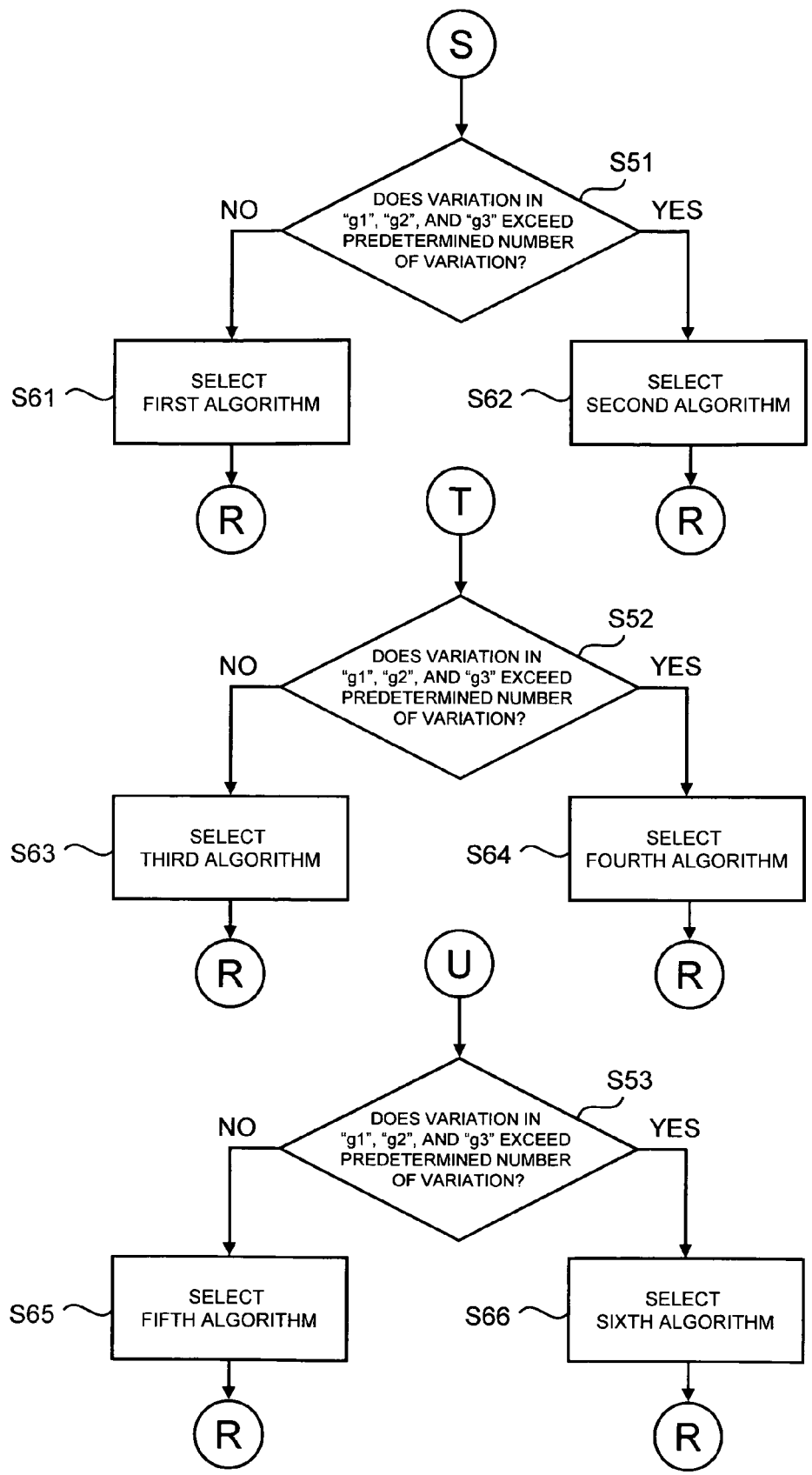
FIG. 21 is flowchart for explaining remaining part of a selection operation by the algorithm selecting unit.

FIG. 20 and FIG. 21 are flowcharts for explaining a selection operation by the algorithm selecting unit 83. Reference symbols S, T, and U shown in FIG. 20 continue to the reference symbols S, T, and U shown in FIG. 21, respectively. The reference symbol R shown in FIG. 21 continues to the reference symbol R shown in FIG. 20.

As shown in FIG. 20, the algorithm selecting unit 83 within the determination unit 31 obtains the count data 32a supplied from the counting unit 32 (step S40). This step can be shared with step S30 shown in FIG. 13.

Next, it is determined whether at least one of the numbers of products in progress "p1", "p2", and "p3" stored in the storage areas $10p_1$ to $10p_3$ exceeds a threshold value n1, by referring to "p1", "p2", and "p3" (step S41). This is the determination of whether products in progress are accumulated to a large extent in the key process, that is, whether the work in progress needs to be equalized.

When at least one of "p1", "p2", and "p3" exceeds the threshold value n1 as a result of the determination (step S41: YES), a variation of the numbers of products in progress "g1", "g2", and "g3" included in the groups G1, G2, and G3 is calculated, as shown in FIG. 21, thereby determining whether the variation exceeds a predetermined number of variation (step S51). This is the determination of whether there is a large difference in the numbers of products in progress between groups. The determination is made by calculating a standard deviation of the numbers of products in progress "g1", "g2", and "g3".

When the number of products in progress for each kind of product does not exceed the predetermined number of variation (step S51: NO), the first algorithm is selected (step S61). On the other hand, when the number of products in progress for each kind of product exceeds a predetermined number of variation (step S61: YES), the second algorithm is selected (step S62). When the step S61 or the step S62 is completed, the process returns to step S40 shown in FIG. 20, and the count data 32a is obtained again. Preferably, the count data 32a is obtained again after a certain period using a timer.

When none of "p1", "p2", and "p3" exceeds the threshold value n1 as a result of the determination at step S41 (step S41: NO), variation of the numbers of products in progress "a", "b", "c", "p1", "p2", and "p3" corresponding to the respective processes is calculated, thereby determining whether the variation exceeds a predetermined number of variation (step S42). This is the determination of whether a large variation occurs in the number of products in progress corresponding to each process, that is, whether the total number of products in progress needs to be equalized.

Accordingly, when the number of products in progress corresponding to each process exceeds the predetermined number of variation (step S42: YES), a determination similar to that at step S51 is performed (step S52). When the number of products in progress for each group does not exceed the predetermined number of variation (step S52: NO), the third algorithm is selected (step S63). When the number of products in progress for each group exceeds the predetermined number of variation (step S52: YES), the fourth algorithm is selected (step S64). When step S63 or step S64 is completed, the process returns to step S40, and the count data 32a is obtained again. Preferably, the count data 32a is obtained again after a certain period using a timer.

On the other hand, when the number of products in progress corresponding to each process does not exceed the predetermined number of variation (step S42: NO), it is determined whether at least one of the numbers of products in progress "a", "b", "c", "p1", "p2", and "p3" corresponding to the respective processes is lower than a threshold value n2 (<n1) (step S43). This is the determination of whether there is a process having a small number of products in progress, that is, whether there is a process in which the number of products in progress needs to be increased.

When at least one of the numbers of products in progress "a", "b", "c", "p1", "p2", and "p3" is lower than the threshold value n2 (step S43: YES), a determination similar to that at step S51 is performed (step S53). When the number of products in progress for each group does not exceed the predetermined number of variation (step S53: NO), the fifth algorithm is selected (step S65). When the number of products in progress for each group exceeds the predetermined number of variation (step S53: YES), the sixth algorithm is selected (step S66). When step S65 or step S66 is completed, the process returns to step S40, and the count data 32a is obtained again. Preferably, the count data 32a is obtained again after a certain period using a timer.

When none of the numbers of products in progress "a", "b", "c", "p1", "p2", and "p3" is lower than the threshold value n2 (step S43: NO), a predetermined algorithm (the first algorithm, for example) is selected (step S44). When step S24 is completed, the process returns to step S40, and the count data 32a is obtained again. Preferably, the count data 32a is obtained again after a certain period using a timer.

As explained above, when the algorithm selecting unit 83 is used to automatically select an algorithm for determining the priority with the same kind of product, the operator does not need perform the operation.

While a preferred embodiment of the present invention has been described hereinbefore, the present invention is not limited to the aforementioned embodiment and various modifications can be made without departing from the spirit of the present invention. It goes without saying that such modifications are included in the scope of the present invention.

For example, in the explanations of the above embodiment, the number of the processing device (the processing device P) that performs the key operation is one. However, the present invention can be also applied when there are plural processing devices in one production line.

In the above embodiment, while the processing device (the processing device P) that performs the key process is shared to manufacture two kinds of products (the product α and the product β), the present invention can be also applied when the processing device that performs the key process is shared to manufacture three or more kinds of products.

In the above embodiment, while the number of times of performing the key process of each kind of product, that is, the number Y of times of passing the processing device P, is two or more, the present invention can be also applied when Y=1.

In the above embodiment, while the present invention is applied to the production line of semiconductor chips, the application of the present invention is not limited thereto, and the present invention can be also applied to the total job-shop production line.

What is claimed is:

1. A production management method of a production line including a plurality of key processes sharing a same processing device in a production of a plurality of kinds of products, the production management method comprising:
   a first step for calculating a score of each kind of product by performing a calculation using an input ratio of each kind of product and number of times of passing a processing device for each kind of product; and
   a second step of determining a first priority order of the key processes between different kinds of products based on the calculated score;
   said method further comprising controlling an order in which said key processes are performed upon said plurality of kinds of products, in accordance with said first priority order.

2. The production management method as claimed in claim 1, wherein at the second step, number of work in process per unit time of the key processes of each kind of product is made proportional to the score of each kind of product.

3. The production management method as claimed in claim 2, wherein at the second step, a progression having an inverse number of the score of each kind of product as an increment is generated, and an order of work in process of the key processes of each kind of product is determined in the order of obtained numeric values.

4. The production management method as claimed in claim 3, wherein at the second step, the numeric values are related to kinds of products, the numeric values are arranged in an ascending order or a descending order, and order of kinds of products related to arranged numeric values are set as order of work in process of key processes.

5. The production management method as claimed in claim 1, further comprising a third step for determining a second priority order of the key processes within the same kind of product.

6. The production management method as claimed in claim 5, wherein at the third step, the second priority order of the key processes are determined based on a First In First Out (FIFO) method.

7. The production management method as claimed in claim 5, wherein at the third step, the second priority orders of the key processes are determined based on a Last Buffer First Served method.

8. The production management method as claimed in claim 5, wherein at the third step, a key process having a largest number of products in progress present immediately before is prioritized.

9. The production management method as claimed in claim 5, wherein the third step includes:
  a first sub-step for classifying a series of processes in the production line of each kind of product into a plurality of groups based on the key processes, and obtaining number of products in progress of each of the plurality of groups; and
  a second sub-step for determining the second priority order of the plurality of key processes based on the number of products in progress of each obtained group.

10. The production management method as claimed in claim 9, wherein at the second sub-step, the second priority order are determined by increasing a priority of the key processes included in the group having a large number of the products in progress.

11. A production management system that manages a production line including a plurality of key processes sharing a same processing device in a production of a plurality of kinds of products, the production management system comprising:
  a first determination part that determines a first priority order of the key processes between different kinds of products,
  wherein the first determination part calculates a score of each kind of product by performing a calculation using an input ratio of each kind of product and number of times of passing a processing device for each kind of product; and determines the first priority order of the key processes between different kinds of products based on the calculated score; and
  wherein said first determination unit controls an order in which said key processes are performed upon said plurality of kinds of products, in accordance with said first priority order.

12. The production management system as claimed in claim 11, wherein the first determination part makes number of work in process per unit time of the key processes of each kind of product proportional to the score of each kind of product.

13. The production management system as claimed in claim 12, wherein the first determination part generates a progression having an inverse number of the score of each kind of product as an increment, and determines an order of work in process of the key processes of each kind of product in the order of obtained numeric values.

14. The production management system as claimed in claim 11, further comprising a second determination part that determines a second priority order of the key processes within the same kind of product.

* * * * *